(12) United States Patent
Ikeda et al.

(10) Patent No.: US 11,698,578 B2
(45) Date of Patent: Jul. 11, 2023

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Takuya Ikeda, Tokyo (JP); Fumihiko Iida, Kanagawa (JP); Kentaro Ida, Tokyo (JP); Osamu Shigeta, Chiba (JP)

(73) Assignee: SONY CORPORATION, Tokyo (JP)

( * ) Notice: Subject to any disclaimer, the term of this patent is extended or adjusted under 35 U.S.C. 154(b) by 197 days.

(21) Appl. No.: 16/979,164

(22) PCT Filed: Dec. 20, 2018

(86) PCT No.: PCT/JP2018/047073
§ 371 (c)(1),
(2) Date: Sep. 8, 2020

(87) PCT Pub. No.: WO2019/176218
PCT Pub. Date: Sep. 19, 2019

(65) Prior Publication Data
US 2020/0401031 A1 Dec. 24, 2020

(30) Foreign Application Priority Data
Mar. 16, 2018 (JP) .................. 2018-050019

(51) Int. Cl.
*G03B 21/20* (2006.01)
*G03B 21/14* (2006.01)
*H04N 9/31* (2006.01)

(52) U.S. Cl.
CPC ....... *G03B 21/2053* (2013.01); *G03B 21/145* (2013.01); *G03B 21/2046* (2013.01); *H04N 9/3182* (2013.01)

(58) Field of Classification Search
CPC ............... G03B 21/14; G03B 21/2053; G03B 21/2046; G03B 21/145; G03B 21/28; H04N 9/31; H04N 9/3182
(Continued)

(56) References Cited

U.S. PATENT DOCUMENTS 9,052,794 B2 * 6/2015 Hiroi ..................... G06F 3/0481
2008/0316432 A1 12/2008 Tejada
(Continued)

FOREIGN PATENT DOCUMENTS

CN 102830899 A 12/2012
CN 104427282 A 3/2015
(Continued)

OTHER PUBLICATIONS

International Search Report and Written Opinion of PCT Application No. PCT/JP2018/047073, dated Mar. 19, 2019, 12 pages of ISRWO.

*Primary Examiner* — Jerry L Brooks
(74) *Attorney, Agent, or Firm* — Chip Law Group

(57) ABSTRACT

[Problem] An information processing apparatus, an information processing method, and a recording medium with which a user can recognize a boundary of a drivable range by feedback for a projection specification position by the user to facilitate determination of and search for a projection position are provided. [Solution] The information processing apparatus includes a controller configured to perform processing of outputting feedback indicating an effect corresponding to a boundary of a drivable region of a drive-type projector in a projection environment space in accordance with a state of a projection specification position specified by a user for the drivable region, the state being determined based on the drivable region and the projection specification position.

20 Claims, 33 Drawing Sheets

DISPLAY UNDRIVABLE REGION

(58) Field of Classification Search
USPC .................. 353/46, 42, 121; 345/158, 157
See application file for complete search history.

(56) References Cited

U.S. PATENT DOCUMENTS

| | | | |
|---|---|---|---|
| 2011/0175940 A1* | 7/2011 | Terauchi | H04N 9/3185 |
| | | | 345/690 |
| 2012/0038677 A1 | 2/2012 | Hiroi et al. | |
| 2012/0317513 A1 | 12/2012 | Mochizuki et al. | |
| 2015/0304615 A1 | 10/2015 | Hiroi | |
| 2015/0317037 A1 | 11/2015 | Suzuki | |
| 2016/0062406 A1 | 3/2016 | Watanabe | |

FOREIGN PATENT DOCUMENTS

| | | |
|---|---|---|
| EP | 2418571 A1 | 2/2012 |
| EP | 2535798 A1 | 12/2012 |
| JP | 2010-078974 A | 4/2010 |
| JP | 2010-243951 A | 10/2010 |
| JP | 2011-077594 A | 4/2011 |
| JP | 2011-154345 A | 8/2011 |
| JP | 2013-003651 A | 1/2013 |
| JP | 2016085380 A | 5/2016 |
| WO | 2010/116578 A1 | 10/2010 |
| WO | 2016/129489 A1 | 8/2016 |
| WO | 2017/154609 A1 | 9/2017 |
| WO | 2018/012524 A1 | 1/2018 |

* cited by examiner

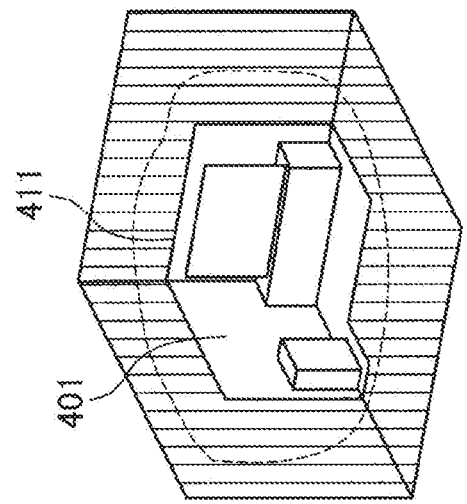
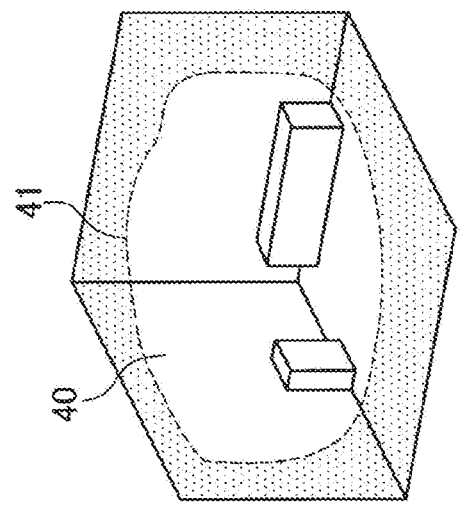
FIG.5

FIG.7
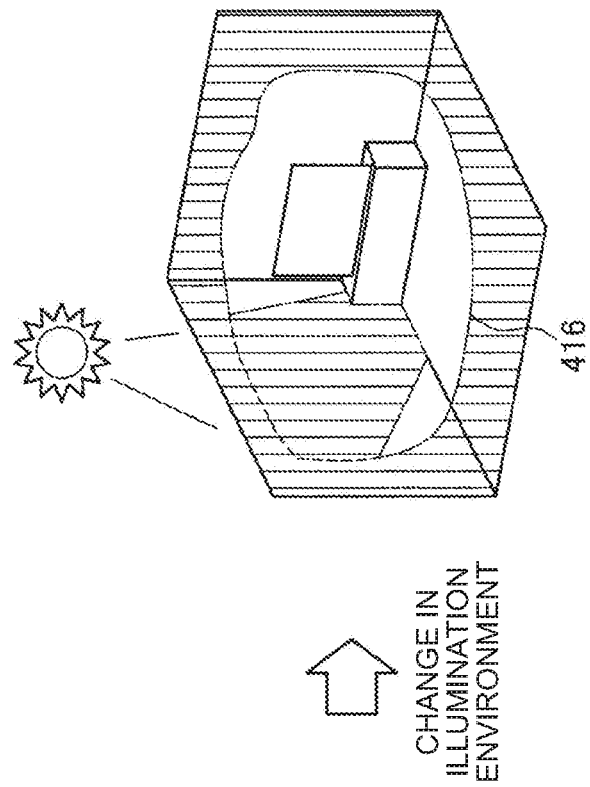
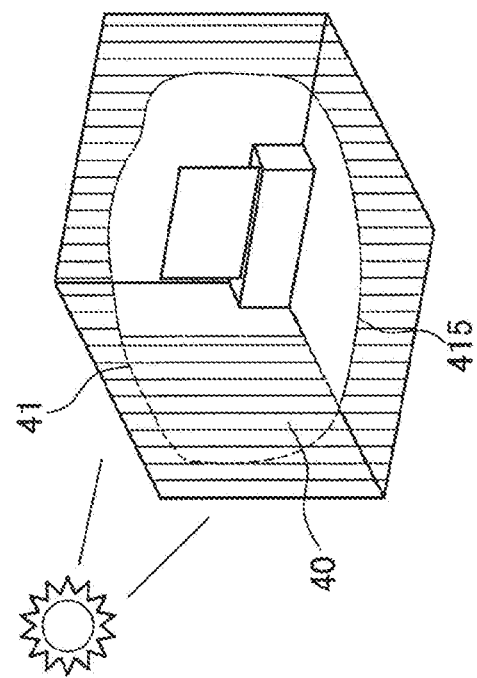

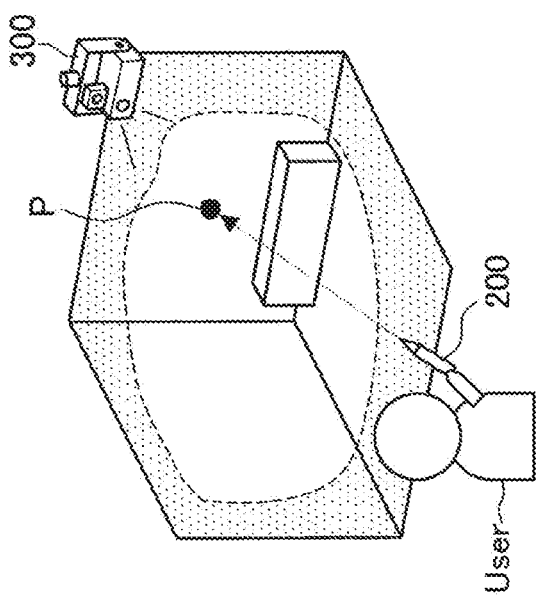
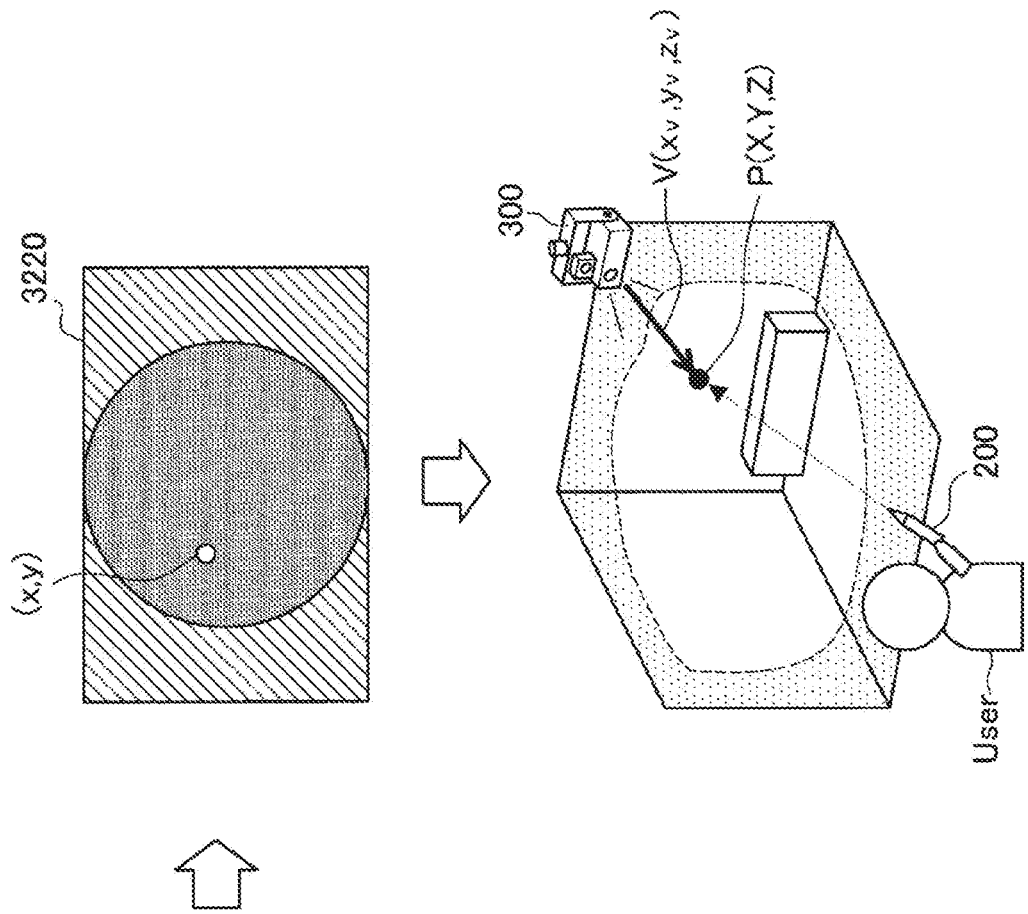
FIG.9

CAMERA COORDINATE SYSTEM

FIG.23
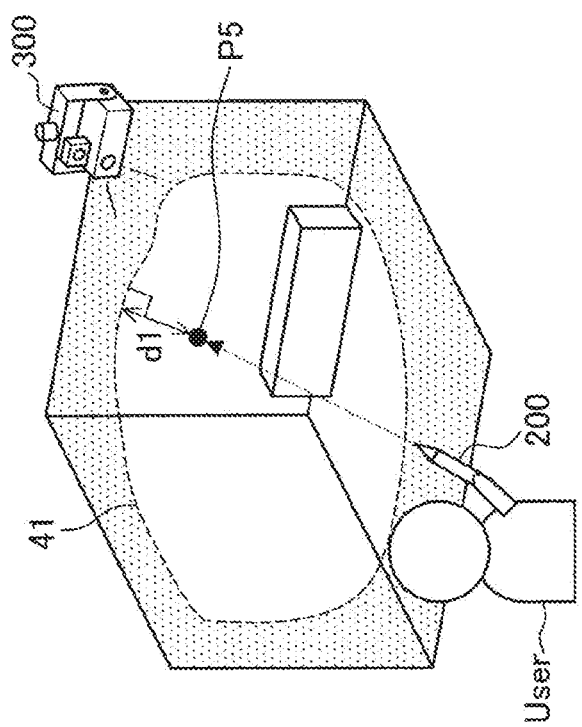
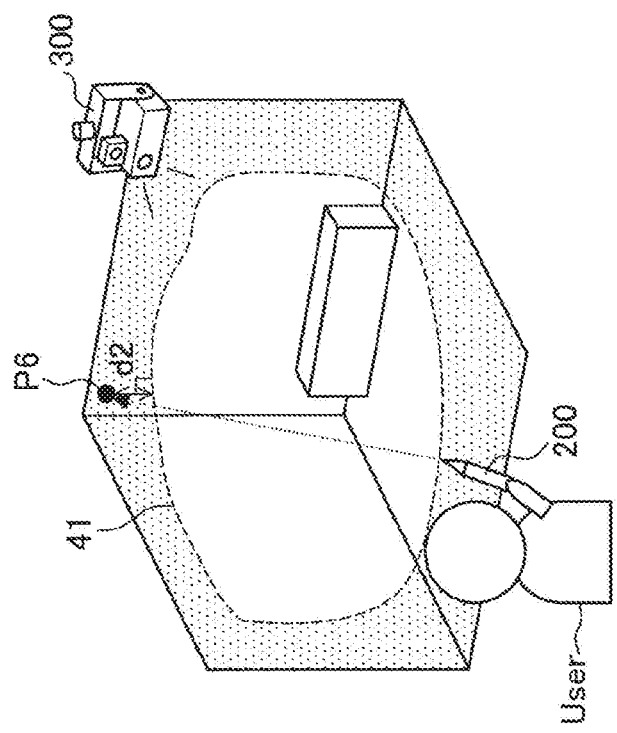

BOUNDARY OF
DRIVABLE REGION

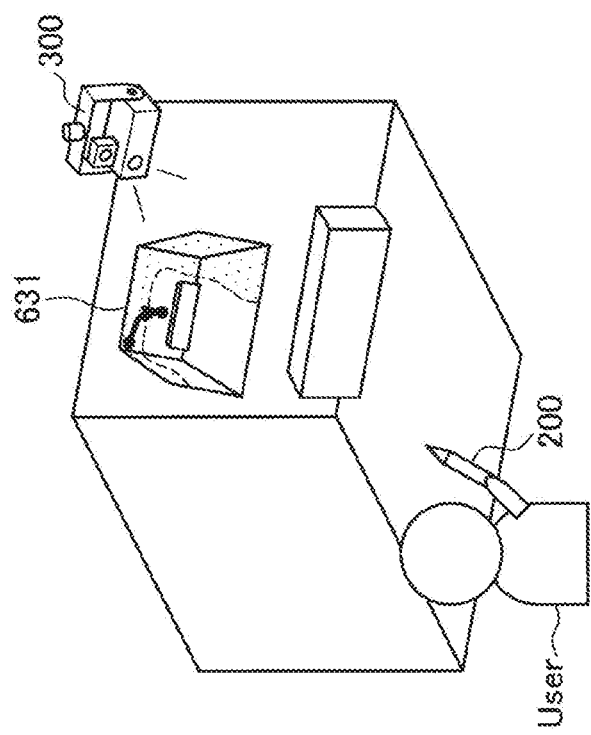
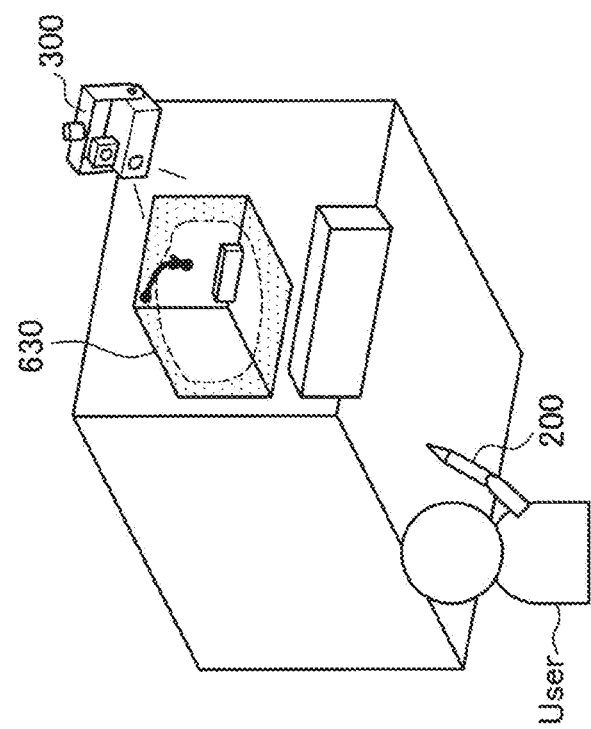
FIG.25

FIG.30
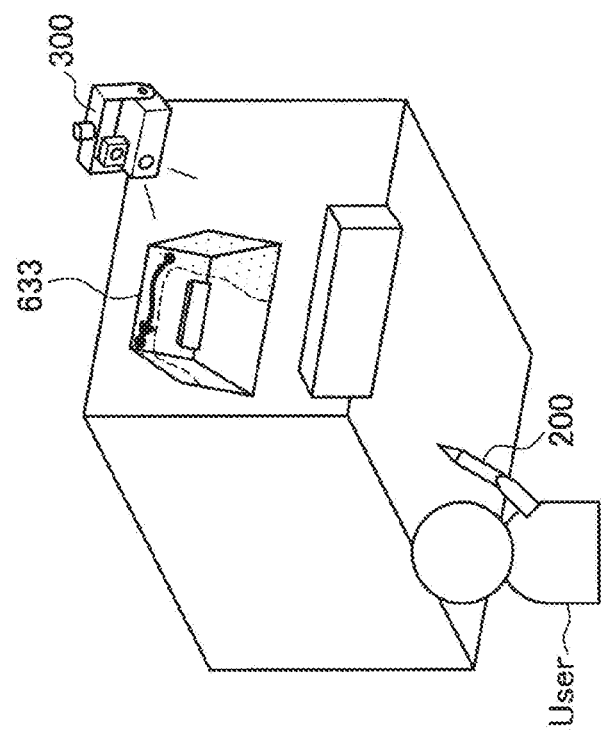
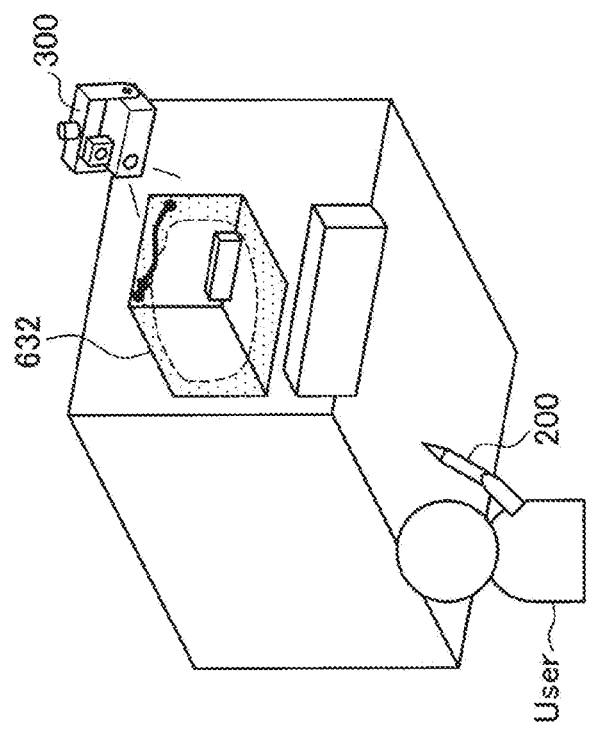

FIG.32
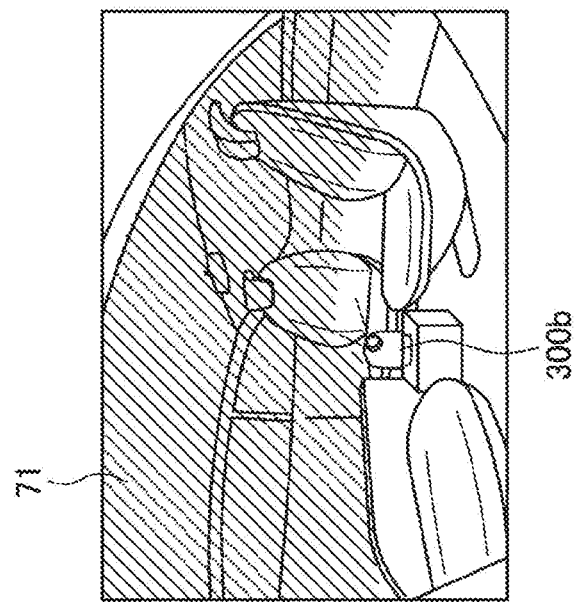
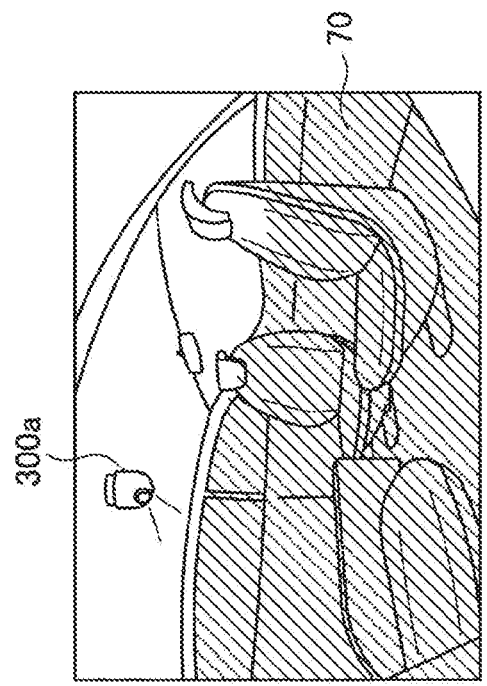

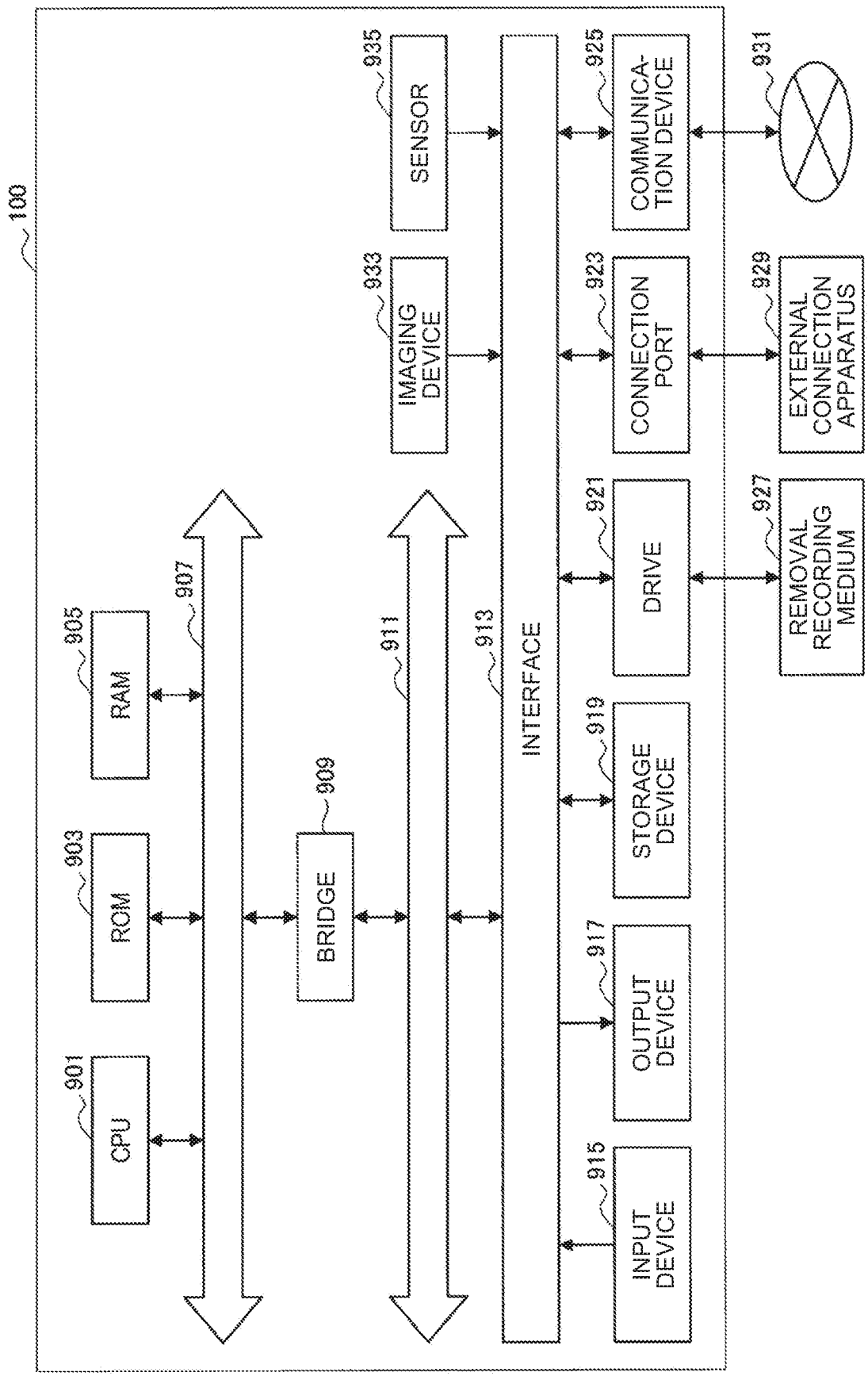

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2018/047073 filed on Dec. 20, 2018, which claims priority benefit of Japanese Patent Application No. JP 2018-050019 filed in the Japan Patent Office on Mar. 16, 2018. Each of the above-referenced applications is hereby incorporated herein by reference in its entirety.

FIELD

The present disclosure relates to an information processing apparatus, an information processing method, and a recording medium.

BACKGROUND

In recent years, as for projectors that project video images onto a wall or a screen, a drive-type projector including a pan-tilt drive mechanism has been developed. The drive-type projector can project a video image onto a desired place by being driven.

A technique of projecting a video image onto a desired place by arranging a mirror having the pan-tilt drive mechanism on a projector front surface and changing the reflection direction of the mirror in addition to driving of the projector itself has been also proposed.

The projector can also be driven so as to display a video image at a place pointed by a user by combining a pointing device such as a laser pointer and a wide-angle camera for observing a pointing position. For example, the following Patent Literature 1 describes a system that switches display of a video image by one projector and display thereof by the other projector in a portion on which projection regions of a fixed-type projector and a drive-type projector overlap each other.

CITATION LIST

Patent Literature

Patent Literature 1: International Publication No. 2017/154609

SUMMARY

Technical Problem

In a projection system using the drive-type projector, however, a region in which driving is not possible is present due to structural restrictions of the drive-type projector.

The present disclosure proposes an information processing apparatus, an information processing method, and a recording medium with which a user can recognize a boundary of a drivable region by feedback for a projection specification position to facilitate determination of and search for a projection position.

Solution to Problem

According to the present disclosure, an information processing apparatus is provided that includes a controller configured to perform processing of outputting feedback indicating an effect corresponding to a boundary of a drivable region of a drive-type projector in a projection environment space in accordance with a state of a projection specification position specified by a user for the drivable region, the state being determined based on the drivable region and the projection specification position.

According to the present disclosure, an information processing method is provided that includes: outputting, by a processor, feedback indicating an effect corresponding to a boundary of a drivable region of a drive-type projector in a projection environment space in accordance with a state of a projection specification position specified by a user for the drivable region, the state being determined based on the drivable region and the projection specification position.

According to the present disclosure, a recording medium recording a computer program is provided that includes causes a computer to function as a controller that performs processing of outputting feedback indicating an effect corresponding to a boundary of a drivable region of a drive-type projector in a projection environment space in accordance with a state of a projection specification position specified by a user for the drivable region, the state being determined based on the drivable region and the projection specification position.

Advantageous Effects of Invention

As described above, the present disclosure enables a user to recognize a boundary of a drivable region by feedback for a projection specification position to facilitate determination of and search for a projection position.

The above-mentioned effect is not necessarily limiting and any of the effects described in the present specification or other effects that can be grasped from the specification may be provided in addition to or instead of the above-mentioned effect.

BRIEF DESCRIPTION OF DRAWINGS

FIG. 5 is a view for explaining an example of the determination of the drive boundary based on an actual environment in the embodiment.

FIG. 7 is a view illustrating an example in which the drivable region is changed in consideration of change in an external light amount in the embodiment.

FIG. 9 is a view for explaining recognition of a projection specification position in the embodiment.

FIG. 23 is a view for explaining a distance between a pointing position (projection specification position) and the drive boundary in the embodiment.

FIG. 25 is a view for explaining another feedback example in the embodiment.

FIG. 30 is a view for explaining still another feedback example in the embodiment.

FIG. 32 is a view for explaining an application example to a vehicle cabin environment in the embodiment.

FIG. 34 is a block diagram illustrating an example of the hardware configuration of an information processing apparatus in the embodiment of the present disclosure.

DESCRIPTION OF EMBODIMENTS

Figure 1:
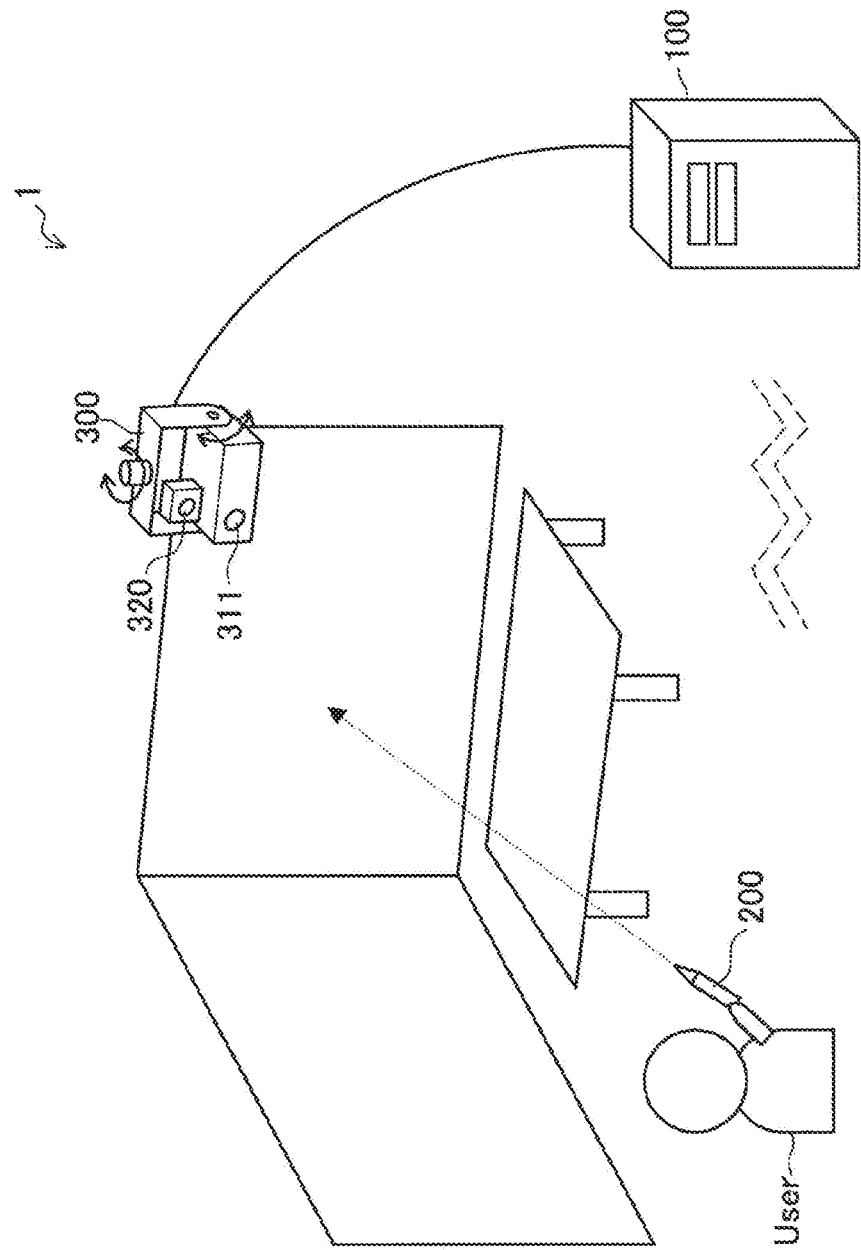
FIG. 1 is a view for explaining outline of an information processing system according to an embodiment of the present disclosure.

Hereinafter, a preferred embodiment of the present disclosure will be described in detail with reference to the accompanying drawings. In the present specification and drawings, components having substantially the same functional configurations are denoted by the same reference numerals and overlapped explanation thereof is therefore omitted.

Explanation will be made in the following order.
1. Outline of Information Processing System according to One Embodiment of Present Disclosure
2. Configuration Example
2-1. Configuration Example of Information Processing Apparatus 100
2-2. Configuration Example of Input Device 200
2-3. Configuration Example of Drive-type Projector 300
3. Operation Processing
3-1. Drivable Region Determination Processing
3-2. Feedback Processing
4. Feedback Examples
4-1. Feedback in Specification from Drivable Region to Undrivable Region
4-2. Feedback in Specification from Undrivable Region to Drivable Region
4-3. Feedback in Specification for Constant Time or Longer in Undrivable Region
5. Application Examples
6. Hardware Configuration
7. Conclusion

1. OUTLINE OF INFORMATION PROCESSING SYSTEM ACCORDING TO ONE EMBODIMENT OF PRESENT DISCLOSURE

FIG. 1 is a view for explaining outline of an information processing system according to one embodiment of the present disclosure. As illustrated in FIG. 1, an information processing system 1 in the embodiment includes an information processing apparatus 100, an input device 200, and a drive-type projector 300 and can control, by the information processing apparatus 100, projection through the drive-type projector 300 installed in a space such as a conference room and an individual room.

The drive-type projector 300 includes a pan-tilt drive mechanism and can project a video image onto a desired place such as a wall, a ceiling, a floor, and a table. For example, a user specifies a projection position using the input device 200. For example, an infrared light emitting diode (IR LED) having high directivity is provided at the tip end of the input device 200, and a desired projection position can be specified by pointing the position from a position distanced from a projection region (what is called an infrared laser pointer). The information processing apparatus 100 detects a pointing position by a sensor 320 and drives the drive-type projector 300 so as to display the video image at the place pointed by the user.

BACKGROUND

In the projection system using the drive-type projector, the drive-type projector cannot be driven at a certain angle or more in some cases due to a drive range of a motor to be driven, design of the hardware mechanism, the field angle of a camera that recognizes a pointing device, or the like. Also when a video image is projected onto a desired place by a mirror reflection-type projector, projection onto some regions is sometimes impossible due to the nature of a mirror.

In consideration of these restrictions, in the embodiment, when a user determines a desired projection position, the user can recognize a boundary of a drivable region in a projection environment space by feedback for a projection specification position to facilitate determination of and search for the projection position. In the present specification, the drivable region (of the drive-type projector) is a range in the projection environment space onto which the drive-type projector can project video images by driving and the boundary thereof corresponds to the center of a projection optical axis (center of a projection image).

As specific feedback examples will be described later, for example, the information processing apparatus 100 provides, to the user, feedback of applying a predetermined effect to a pointer projected onto a pointing position and so on when the user attempts to specify an undrivable region (that is, the projection specification position is close to the boundary of the drivable region) or the user specifies the undrivable region, thereby causing the user to recognize the boundary of the drivable region. The information processing apparatus 100 can also perform feedback for causing the user to recognize the direction in which driving is possible (that is, the drive-type projector can project a video image) when the user attempts to project the video image onto the vicinity of the boundary of the drivable region or the outside of the region (that is, undrivable region).

Hereinbefore, the information processing system according to the embodiment of the present disclosure has been explained. Subsequently, the specific configurations of the devices included in the information processing system in the embodiment will be explained with reference to the drawings.

2. CONFIGURATION EXAMPLE

Figure 2:
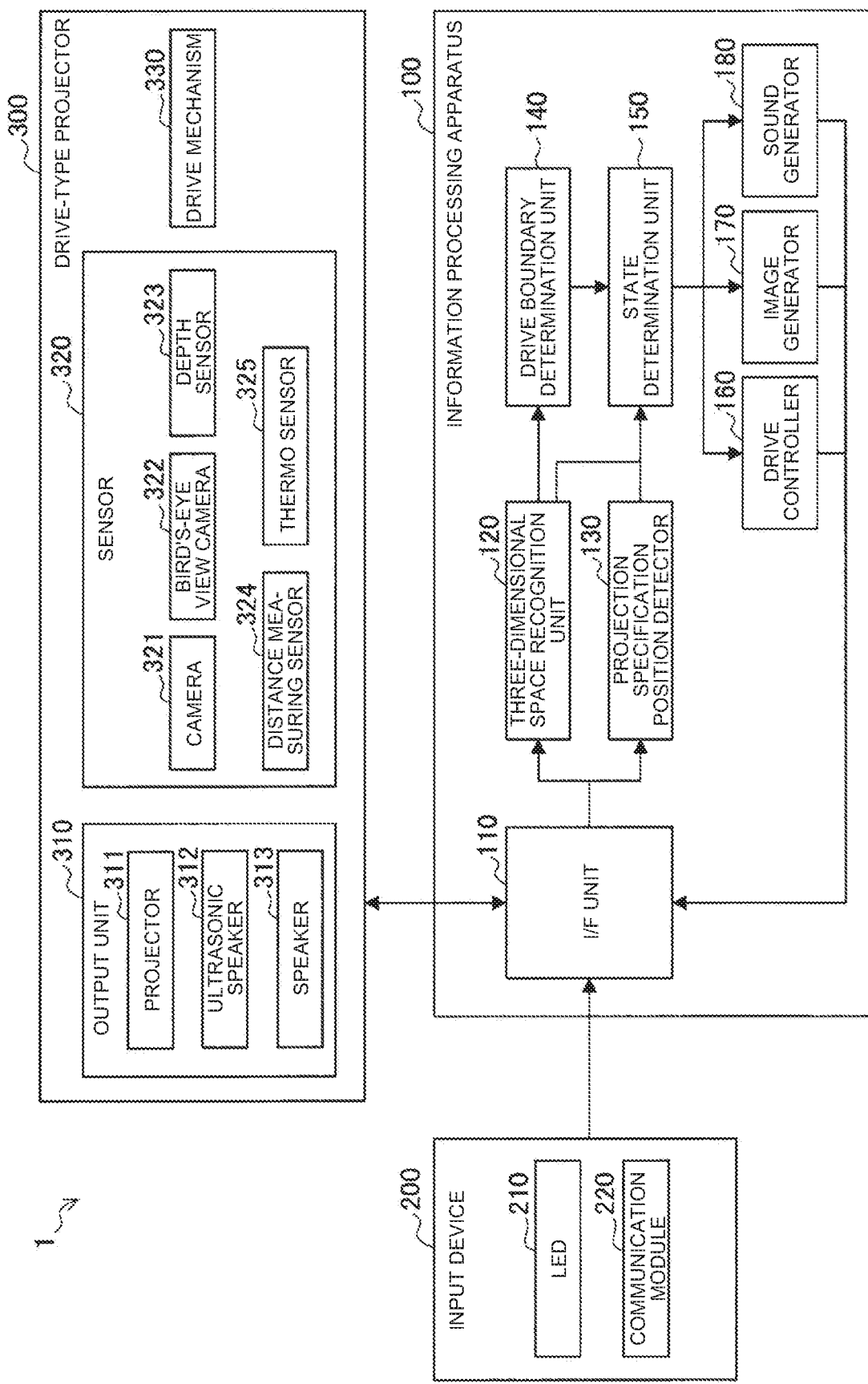
FIG. 2 is a diagram illustrating an example of the functional configuration of the information processing system in the embodiment of the present disclosure.

FIG. 2 is a diagram illustrating an example of the functional configuration of the information processing system 1 in the embodiment of the present disclosure. As illustrated in FIG. 2, the information processing system 1 includes the information processing apparatus 100, the input device 200, and the drive-type projector 300.

<2-1. Configuration Example of Information Processing Apparatus 100>

The information processing apparatus 100 includes a controller functioning as an interface (I/F) unit 110, a three-dimensional space recognition unit 120, a projection specification position detector 130, a drive boundary determination unit 140, a state determination unit 150, a drive controller 160, an image generator 170, and a sound generator 180.

(I/F Unit 110)

The I/F unit 110 is a connection device for connecting the information processing apparatus 100 and another apparatus. The I/F unit 110 is implemented by, for example, a universal serial bus (USB) connector and inputs and outputs information to and from components of the input device 200 and the drive-type projector 300. The I/F unit 110 is connected to the input device 200 and the drive-type projector 300 by, for example, a wireless/wired local area network (LAN), digital living network alliance (DLNA (registered trademark)), Wi-Fi (registered trademark), Bluetooth (registered trademark), or other dedicated lines. The I/F unit 110 may be connected to other apparatuses via the Internet or a home network.

For example, the I/F unit 110 receives, from the input device 200, pieces of sensing data from various sensors provided in the input device 200 and receives, from the drive-type projector 300, pieces of sensing data from various sensors included in the sensor 320 of the drive-type projector 300. The I/F unit 110 transmits, to the drive-type projector 300, a drive control signal and output signals of a video image and sound that are generated by the drive controller 160, the image generator 170, and the sound generator 180.

(Controller)

The controller functions as an arithmetic processing device and a control device and controls overall operations in the information processing apparatus 100 in accordance with various computer programs. The controller is implemented by an electronic circuit such as a central processing unit (CPU) and a microprocessor, for example. The controller may include a read-only memory (ROM) storing therein computer programs, arithmetic parameters, and the like to be used and a random-access memory (RAM) temporarily storing therein parameters and the like that appropriately change.

To be specific, as illustrated in FIG. 2, the controller functions as the three-dimensional space recognition unit 120, the projection specification position detector 130, the drive boundary determination unit 140, the state determination unit 150, the drive controller 160, the image generator 170, and the sound generator 180.

Three-dimensional Space Recognition Unit 120

The three-dimensional space recognition unit 120 recognizes a three-dimensional shape of the projection environment space (for example, a room in which the drive-type projector 300 is installed), three-dimensional shapes and three-dimensional positions of objects present in the projection environment space, a three-dimensional position, a posture, a gesture, and the like of the user based on the pieces of sensing data (images imaged by a camera 321 and a bird's-eye view camera 322, depth information from a depth sensor 323, distance information from a distance measuring sensor 324, temperature information from a thermo sensor 325, and the like) detected by various sensors provided in the sensor 320. In the embodiment, for example, it is supposed that the three-dimensional shape of the projection environment space is recognized based on the sensing data by the depth sensor 323. The three-dimensional space recognition unit 120 can recognize the three-dimensional shape of the projection environment space and generate a space map of the projection environment. The three-dimensional space recognition unit 120 may measure the three-dimensional shape by stereo matching with the distance measuring sensor 324 and a plurality of cameras. The three-dimensional space recognition unit 120 can also recognize luminance of the projection environment space with external light, indoor illumination, or the like.

Projection Specification Position Detector 130

The projection specification position detector 130 detects the projection specification position (pointing position coordinates) specified by the input device 200. The projection specification position detector 130, for example, detects a light emitting position (bright spot of the emitted IR) by an IR LED 210 of the input device 200 from an image imaged by the bird's-eye view camera 322 capable of observing infrared light with a wide field of view to calculate the pointing position coordinates. Details of the calculation of the pointing position coordinates will be described later with reference to FIG. 8 to FIG. 11.

Although the projection specification position can be detected by only the bird's-eye view camera 322 having the wild field of view, the specification position can also be sensed with higher definition by combining a gaze sensor having a field angle narrower than that of the bird's-eye view camera 322 (for example, an infrared camera having a field angle narrower than that of the bird's-eye view camera 322). The projection specification position can also be detected by using the pieces of sensing data from the depth sensor 323, the distance measuring sensor 324, and the thermo sensor 325 or using the pieces of sensing data from various sensors provided in the input device 200. The projection specification position detector 130 may detect the projection specification position preferentially from the direction to which the user directs the input device 200 further by referring to the three-dimensional position, the posture, and the like of the user that the three-dimensional space recognition unit 120 has recognized.

Although in the embodiment, the laser pointer-type input device 200 is illustrated as an example, the embodiment is not limited thereto and another input device may be used. As an operating member, another operating member (for example, a hand, a finger, or the like of the user) other than the input device 200 may be used instead of the input device 200. The projection specification position detector 130 detects the projection specification position based on, for example, pointing by the user. To be specific, the projection specification position detector 130 regards, as the projection specification position, a position at which the direction pointed by the user's finger and the projection region (wall or the like) are orthogonal to each other based on the three-dimensional position, the posture, the gesture, and the like of the user that the three-dimensional space recognition unit 120 has recognized to calculate the position coordinates.

The projection specification position detector 130 is not limited to specification of the projection position from the position distanced from the projection region and can also recognize specification of the projection position by a touch operation on the projection region.

Furthermore, an operation using a device such as a smartphone can also be performed. For example, the projection position may be specified by operating a GUI including up/down/left/right keys that is displayed on a screen of the smartphone or may be specified by operating a whole-sky image of the projection environment space that is displayed on the screen of the smartphone.

The information processing apparatus 100 can control the drive-type projector 300 so as to project a predetermined pointer image onto the projection specification position detected by the projection specification position detector 130.

Drive Boundary Determination Unit 140

The drive boundary determination unit 140 determines the boundary of the drivable region by the drive-type projector 300 in the projection environment space. The drive boundary determination unit 140 calculates the drivable region in the projection environment space based on the three-dimensional shape of the projection environment space that the three-dimensional space recognition unit 120 has recognized and a drivable angle of the drive-type projector 300 to determine the drive boundary. The drive boundary may be the boundary of the drivable region, for example. The boundary of the drivable region is supposed to be the center of the projection optical axis (center of the projection image) by a projector 311, for example. The drive boundary determination unit 140 may determine the drive boundary by calculating the product of the boundary of the drivable region and a recognition boundary of the sensor (for example, the bird's-eye view camera 322) that is used for detecting the projection specification position. Details of the calculation of the drivable region and the determination of the drive boundary will be described later with reference to FIG. 3 to FIG. 7.

State Determination Unit 150

The state determination unit 150 determines a state of the projection specification position (pointing position) in the drivable region. To be specific, the state determination unit 150 determines a distance from the projection specification position to the drive boundary, a positional relation between the projection specification position and the drive boundary, movement of the projection specification position, and the like. In this case, the state determination unit 150 can determine, as for the projection position specification condition of the user, the following four states in consideration of time-series information of the projection specification position.

State 1: State where the projection specification position is moved to the undrivable region from the drivable region (condition that the projection specification position crosses the drive boundary)

State 2: State where the projection specification position is moved to the drivable region from the undrivable region (condition that the projection specification position crosses the drive boundary)

State 3: State where the projection specification position is located in the undrivable region for constant time or longer State 4: State where the projection specification position is moved in the drivable region In the state 4 among the above-mentioned states, the drive-type projector 300 can be driven for projection with no problem, and feedback in the embodiment is not therefore particularly performed. On the other hand, in the states 1 to 3, the user possibly specifies the projection position in the undrivable region and it is necessary to cause the user to recognize the boundary of the drivable region. The information processing apparatus 100 in the embodiment generates a content (effect) for feedback to the user by the drive controller 160, the image generator 170, or the sound generator 180 based on the determination result from the state determination unit 150 and reflects the content to a drive angle, a projection video image, sound, or the like. The information processing apparatus 100 performs feedback control of intensifying a predetermined effect, and so on as the projection specification position becomes closer to the drive boundary, for example, based on the distance from the projection specification position to the drive boundary, the positional relation therebetween, the movement of the projection specification position crossing the drive boundary, and the like. Details of feedback processing in the embodiment will be described later with reference to FIG. 8 and FIG. 13 to FIG. 31.

Drive Controller 160

The drive controller 160 controls driving of the drive-type projector 300 (controls a drive angle and the like). The drive controller 160 generates a drive control signal instructing a drive position and outputs it to the I/F unit 110. The drive control signal is transmitted to the drive-type projector 300 from the I/F unit 110. The drive controller 160 can also generate the drive control signal in which the determination result from the state determination unit 150 has been reflected. Feedback expression of the drive boundary by the movement of the drive-type projector 300 can thereby be made.

Image Generator 170

The image generator 170 generates an image to be projected from the projector 311 of the drive-type projector 300 and outputs it to the I/F unit 110. The image to be projected is supposed to a pointer or a content to be projected onto the pointing position. The image is transmitted to the drive-type projector 300 from the I/F unit 110. The image generator 170 can also generate an image in which the determination result from the state determination unit 150 has been reflected. Feedback expression of the drive boundary by the image using the pointer, the content, or the like can thereby be made.

Sound Generator 180

The sound generator 180 generates a sound signal to be output from an ultrasonic speaker 312 or a speaker 313 of the drive-type projector 300 and outputs it to the I/F unit 110. The sound signal is transmitted to the drive-type projector 300 from the I/F unit 110. The sound generator 180 can also generate a sound signal in which the determination result from the state determination unit 150 has been reflected. Feedback expression of the drive boundary by sound can thereby be made.

<<2-2. Configuration Example of Input Device 200>>

The input device 200 is a device that is used for input by the user. In the embodiment of the present disclosure, it is mainly supposed that a device including the IR LED 210 having high directivity on the tip end thereof is used. The user directs the input device 200 to a position onto which the user desires to project a content to specify the projection position by an infrared laser. For example, the bird's-eye view camera 322 detects the light emitting position (the bright spot of the emitted IR) by the IR LED 210 and transmits it to the information processing apparatus 100.

Although the light emission by the IR LED 210 has been described as an example, the embodiment is not limited thereto and visible light having directivity may be used.

A mobile terminal such as a smartphone and a wristband-type or eyeglass-type wearable device may be used as the input device 200.

The input device 200 may include a communication module 220. For example, in the input device 200, operation input information such as ON/OFF of the IR LED 210 is transmitted to the information processing apparatus 100 by the communication module 220. The information processing apparatus 100 may thereby perform detection processing of the projection specification position by the projection specification position detector 130 when the IR LED 210 is in an ON state (that is, during light emission), for example.

The input device 200 may include various sensors such as a geomagnetic sensor, a gyro sensor, an acceleration sensor, and a microphone. Pieces of sensing data detected by these sensors are transmitted to the information processing apparatus 100 by the communication module 220.

<2-3. Configuration Example of Drive-type Projector 300>

(Drive Mechanism 330)

The drive-type projector 300 includes a drive mechanism 330 and can change the directions of an output unit 310 and the sensor 320 for sensing desired directions. For example, the drive-type projector 300 can perform drive control by the drive mechanism 330 so as to project a video image onto a predetermined position received from the information processing apparatus 100.

Although in the embodiment, a pan-tilt biaxial drive mechanism is supposed as an example, the embodiment is not limited to the drive mechanism that changes the directions and a mechanism that is movable in the right-left and up-down directions may be provided in combination, for example. Furthermore, although in the embodiment, the mechanism that drives the output unit 310 and the sensor 320 themselves is supposed, a device in which mirrors having drive mechanisms are installed in front of the output unit 310 and the sensor 320 and the sensing directions are changed by changing the directions of the mirrors is also available.

In the embodiment, the device in which the sensor 320 is mounted coaxially with the projector 311 is supposed, and the drive mechanism 330 is supposed to drive the sensor 320 simultaneously with the projector 311. Alternatively, the sensor 320 and the projector 311 may be arranged at different positions. In this case, a positional relation between the sensor 320 and the projector 311 is known.

(Output Unit 310)

The drive-type projector 300 includes the projector 311, the ultrasonic speaker 312, and the speaker 313 as the output unit 310. The ultrasonic speaker 312 having high directivity may be installed coaxially with the projection direction of the projector 311.

(Sensor 320)

The drive-type projector 300 includes the sensor 320 and outputs pieces of information sensed by the sensors to the information processing apparatus 100. For example, the drive-type projector 300 includes the camera 321, the bird's-eye view camera 322, the depth sensor 323, the distance measuring sensor 324, and the thermo sensor 325. In the embodiment, a camera (as an example of a bird's-eye view sensor) that has the wide field angle and observes the infrared light (cuts visible light) is supposed as the bird's-eye view camera 322, and a gaze camera that gazes a region of a narrower field angle than that of the bird's-eye view camera 322 and observes the infrared light is supposed as the camera 321. The camera 321 and the bird's-eye view camera 322 are not, however, limited to the infrared cameras and may include a visible light camera. The camera 321 and the bird's-eye view camera 322 may have a mode in which zooming is performed and a diaphragm is changed.

The depth sensor 323, the distance measuring sensor 324, or the thermo sensor 325 is supposed to be used for three-dimensional space recognition of the projection environment by the three-dimensional space recognition unit 120. The depth sensor 323, the distance measuring sensor 324, or the thermo sensor 325 is, however, not limited to be used for the space recognition and may be used as a bird's-eye view sensor for detecting the projection specification position.

Hereinbefore, the components of the information processing system 1 in the embodiment have been specifically explained. The configuration of the information processing system 1 illustrated in FIG. 2 is an example, and the embodiment is not limited thereto. Although not illustrated in FIG. 2, for example, another apparatus may be connected to the information processing apparatus 100.

The information processing apparatus 100 may be configured by a plurality of devices. The information processing apparatus 100 may be implemented by a smart home terminal, a PC, a home serve, an edge server, an intermediate server, or a cloud server.

3. OPERATION PROCESSING

Subsequently, operation processing of the information processing system 1 in the embodiment will be specifically explained with reference to the drawings.

<3-1. Drive Boundary Determination Processing>

Figure 3:
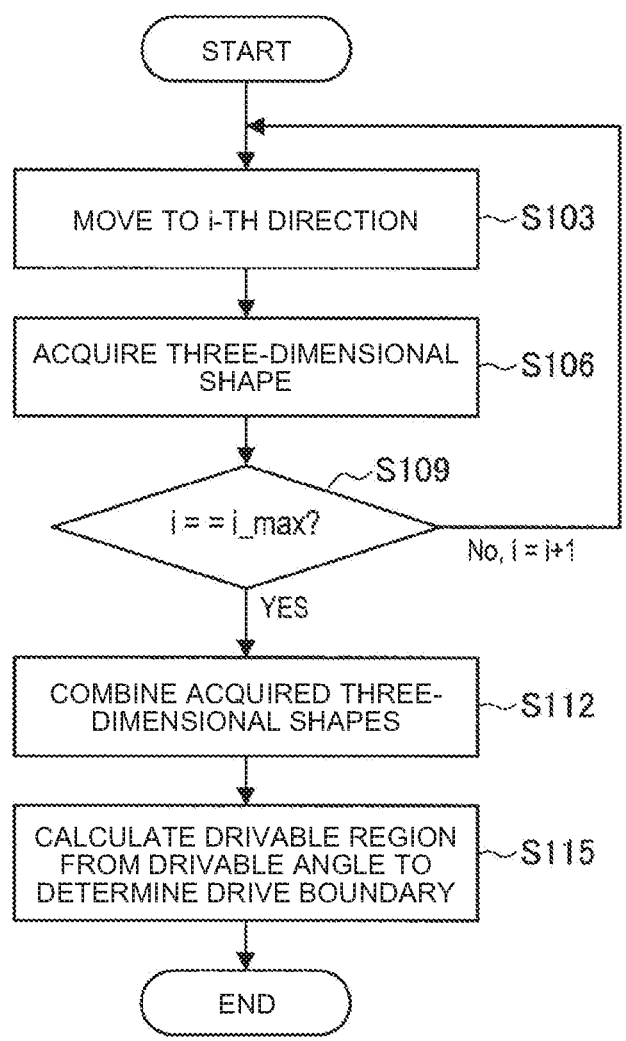
FIG. 3 is a flowchart illustrating an example of flow of calculation processing of a drivable region in the embodiment.

FIG. 3 is a flowchart illustrating an example of flow of drive boundary determination processing in the embodiment. In the embodiment, before projection by the projector, the three-dimensional shape of the projection environment is recognized, the region in which driving is possible in an actual environment is calculated, and the drive boundary is determined.

To be specific, as illustrated in FIG. 3, first, the information processing apparatus 100 acquires pieces of data provided by sensing the projection environment by the depth sensor 323 and acquires the three-dimensional shapes of the projection environment based on the pieces of sensed data by the three-dimensional space recognition unit 120 while driving the drive-type projector 300 at previously registered i_max drive angles in order (steps S103 to S109). The information processing apparatus 100 can thereby observe, using the depth sensor 323, the entire region in which driving by the drive-type projector 300 is possible. Although the depth sensor 323 is used as an example for sensing the projection environment, the embodiment is not limited thereto. Alternatively, sensing by the camera 321, the bird's-eye view camera 322, the distance measuring sensor 324, the thermo sensor 325, or the like mounted on the drive-type projector 300 may be performed for the entire region in which driving is possible.

Then, the drive boundary determination unit 140 of the information processing apparatus 100 combines the above-mentioned acquired three-dimensional shapes to provide the three-dimensional shape of the projection environment (step S112).

Subsequently, the drive boundary determination unit 140 calculates the drivable region of the drive-type projector 300 from the provided three-dimensional shape and the drivable angle of the drive-type projector 300 to determine the drive boundary (S115). The determination of the drive boundary in the embodiment will be explained with reference to FIG. 4.

Figure 4:
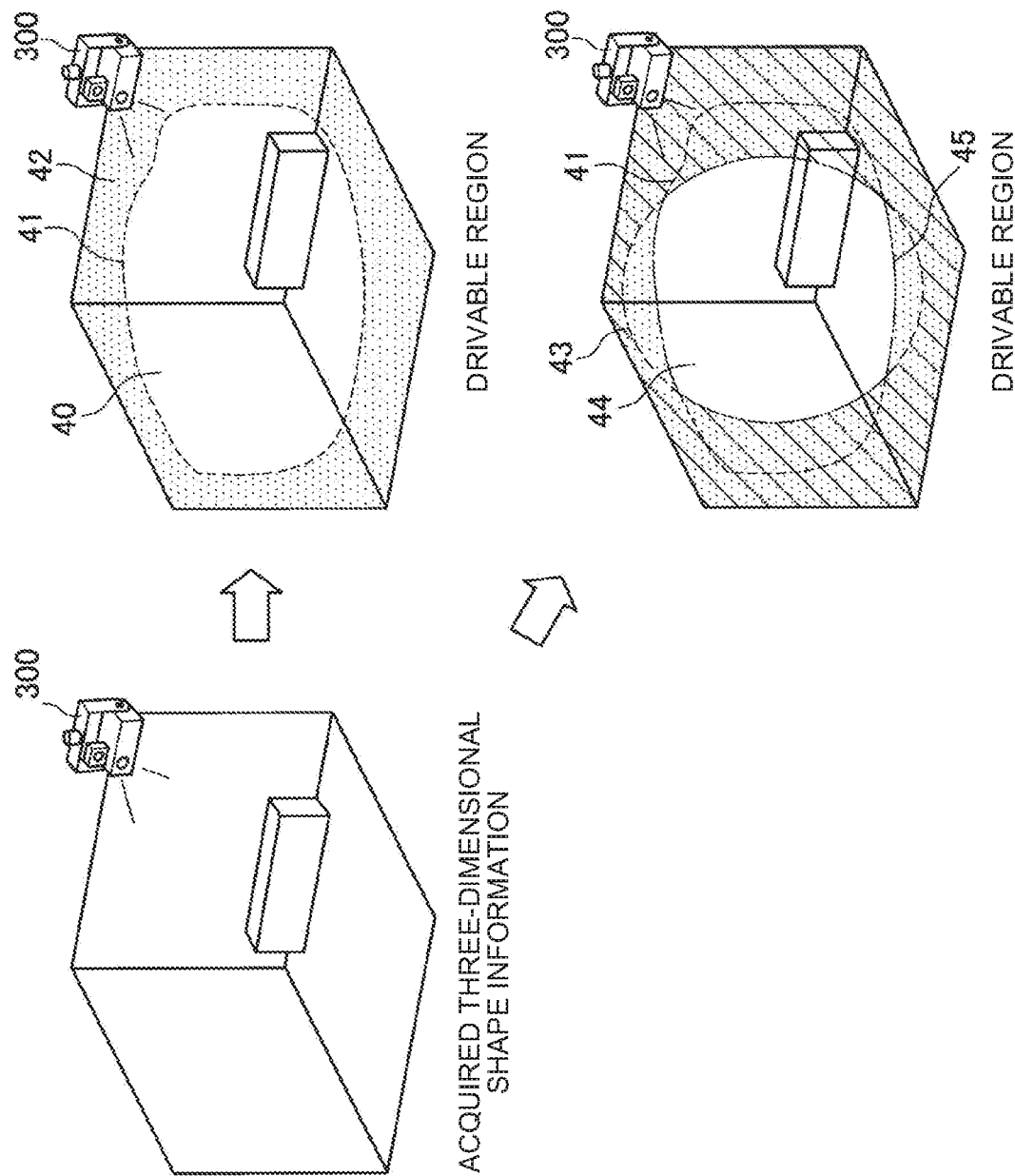
FIG. 4 is a view for explaining determination of a drive boundary in the embodiment.

The drive boundary determination unit 140 acquires three-dimensional shape information by driving the drive-type projector 300 and observing the entire drivable region in the projection environment as illustrated on the left side of FIG. 4, and then, determines a drive boundary 41 of a drivable region 40 to be the drive boundary based on the drivable angle of the drive-type projector 300 as illustrated on the right side of FIG. 4. In this case, a region outside the drive boundary corresponds to an undrivable region 42.

The drive boundary determination unit 140 may determine the drive boundary by calculating the product of the drivable region and a recognizable region of the sensor 320 (for example, the bird's-eye view camera 322) for detecting the pointing position. To be specific, as illustrated on the lower right side of FIG. 4, a boundary 45 of a region 44 in the drive boundary 41 of the drivable region and in a recognition boundary 43 of the sensor may be determined to be the drive boundary.

The drive boundary determination unit 140 may determine the drive boundary based on an actual environment. For example, in the drivable region 40, the drive boundary may be set along boundaries of actual objects such as furniture and home appliances or the drive boundary may be set by straight lines along spatial axes (X, Y, Z axes). FIG. 5 is a view for explaining an example of the determination of the drive boundary based on the actual environment in the embodiment. As illustrated in FIG. 5, for example, in the drivable region 40, a region surrounded by extended lines along the actual objects such as furniture placed in a room may be set to a drivable region 401 and a boundary 411 thereof may be set to the drive boundary. As described above, the drive boundary is set with reference to the visible actual objects, so that the user is easy to recognize the invisible drive boundary.

The case in which the projection environment space changes due to external factors such as movement of the furniture is also supposed. The drive boundary determination unit 140 may then dynamically change the drive boundary appropriately in accordance with the above-mentioned change in the projection environment space. In this case, a region in which driving is possible based on the structural restrictions of the drive-type projector 300 is set to be the largest region, and a drive range is increased or decreased in the region. Examples thereof are illustrated in FIG. 6 and FIG. 7 below.

Figure 6:
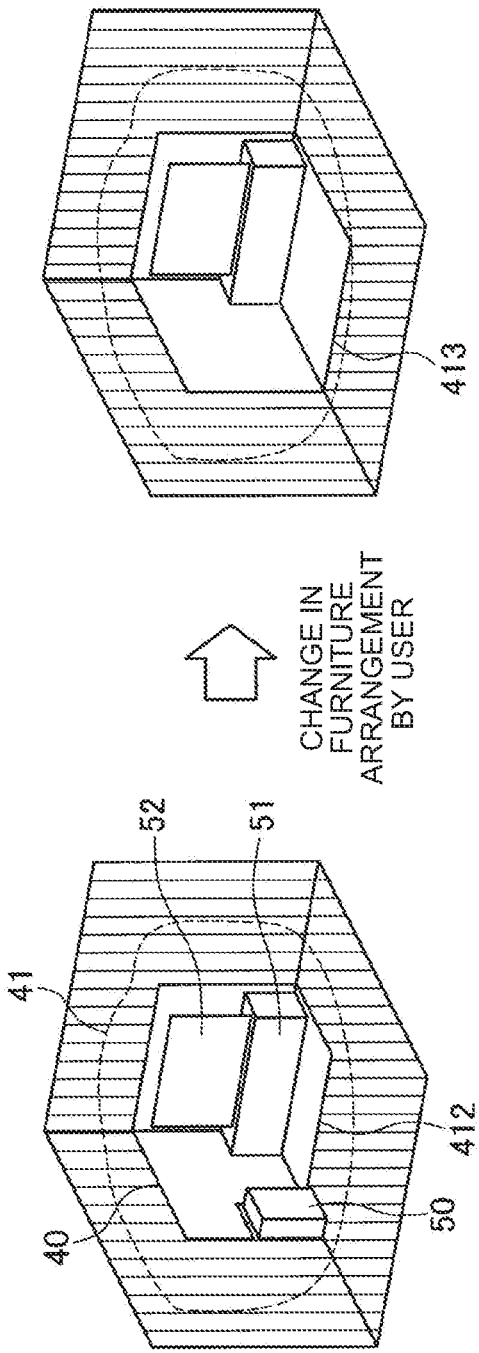
FIG. 6 is a view illustrating an example in which the drivable region is changed in consideration of change in furniture arrangement in the embodiment.

FIG. 6 is a view illustrating an example in which the drivable region is changed in consideration of change in furniture arrangement. As illustrated on the left side of FIG. 6, first, in the drivable region 40 (drive boundary 41) while the region in which driving is possible based on the structural restrictions of the drive-type projector 300 is set to be the largest region, for example, a boundary 412 of a region excluding an actual object 50 is determined to be the drive boundary in consideration of arrangement of actual objects 50 to 52. Then, when arrangement of the furniture is changed and the actual object 50 is removed as illustrated on the right side of FIG. 6, projection onto the floor and wall hidden by the actual object 50 also becomes possible. The drive boundary determination unit 140 therefore changes the drive boundary to a boundary 413 of a region including these regions. The drive boundary determination unit 140 calculates difference of the acquired three-dimensional shapes. When the difference is equal to or more than a predetermined threshold (a value to the extent of rounding sensing errors), the drive boundary determination unit 140 determines that the furniture arrangement is changed, and updates the drive boundary.

Change in the environment is not limited to the change in the furniture arrangement and is supposed to be, for example, changes in an external light or indoor illumination environment. The luminance of the projection environment space can be detected by a luminance sensor (not illustrated) provided in the drive-type projector 300 or a luminance sensor installed in the room. FIG. 7 is a view illustrating an example in which the drivable region is changed in consideration of change in an external light amount. As illustrated on the left side of FIG. 7, first, in the drivable region 40 (drive boundary 41) while the region in which driving is possible based on the structural restrictions of the drive-type projector 300 is set to be the largest region, a region with high luminance due to sunlight or the like has lower visibility of a projection image, so that a boundary 415 of a region excluding the above-mentioned region is determined to be the drive boundary. Since an illumination region of the sunlight changes over time, for example, the drive boundary determination unit 140 newly recognizes the region excluding the region with high luminance in accordance with the change in the illumination region by the sunlight and determines a boundary 416 of the region to be the drive boundary, as illustrated on the right side of FIG. 7. The drive boundary determination unit 140, for example, successively observes change in lightness of a projection place with the camera (the camera 321, the bird's-eye view camera 322, or the like) and updates the drive boundary when the lightness becomes equal to or more than a predetermined threshold.

The information processing apparatus 100 may notify the user of the update of the drive boundary by means of sound, wording, or a bird's-eye view clearly expressing the drive boundary in the projection environment.

The calculation of the drivable region and the determination of the drive boundary have been specifically described above. Next, feedback processing of causing the user to recognize the boundary of the drivable region using pieces of information about the drivable region and the drive boundary determined as described above will be described.

<3-2. Feedback Processing>

Figure 8:
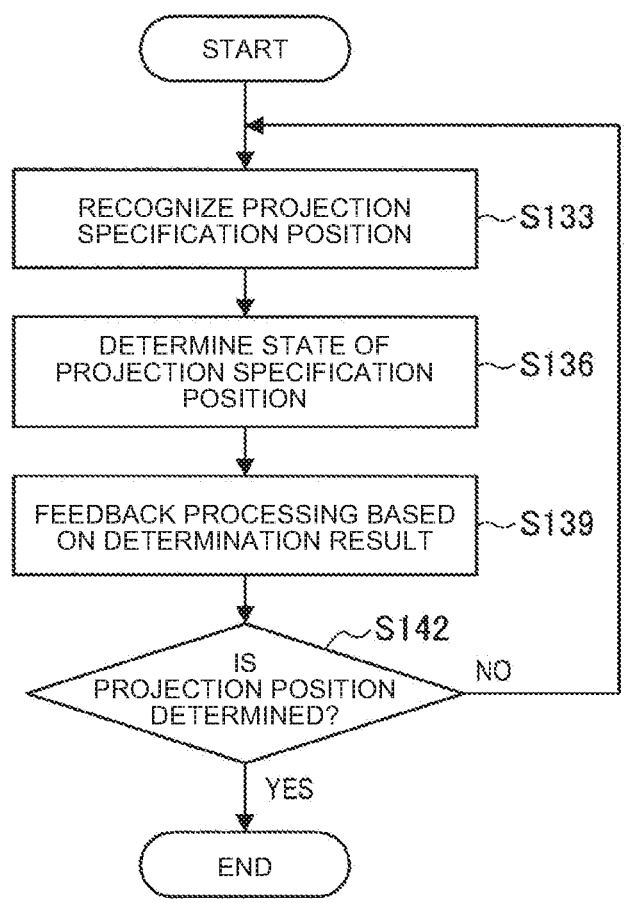
FIG. 8 is a flowchart illustrating an example of flow of feedback processing in the embodiment.
Figure 10:
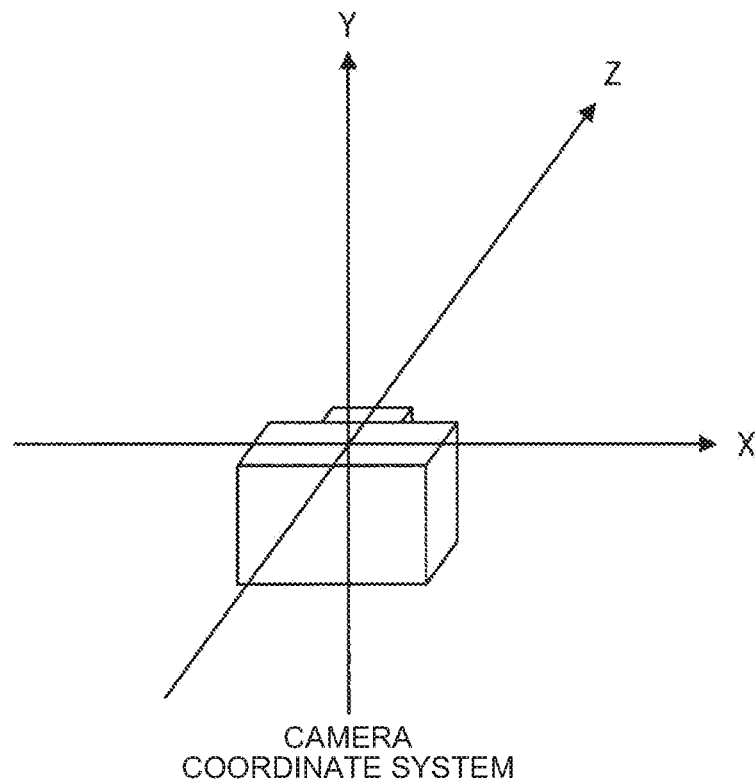
FIG. 10 is a view for explaining a camera coordinate system in the embodiment.

FIG. 8 is a flowchart illustrating an example of flow of the feedback processing in the embodiment.

As illustrated in FIG. 8, first, the information processing apparatus 100 recognizes, using the projection specification position detector 130, the projection position (projection specification position) that the user has specified using the input device 200 (step S133). The recognition of the projection specification position is described with reference to FIG. 9 to FIG. 11.

FIG. 9 is a view for explaining the recognition of the projection specification position in the embodiment. As illustrated in FIG. 9, the infrared light that the user points by the input device 200 is observed with the bird's-eye view camera 322 (for example, a wide-angle camera or a fish-eye camera) of the drive-type projector 300, and the projection specification position detector 130 acquires bright spot coordinates (x, y) from a bird's-eye view camera image 3220. Then, the projection specification position detector 130 calculates a three-dimensional vector $V(x_v, y_v, z_v)$ indicating the bright spot direction from internal parameters (field angle information) of the bird's-eye view camera 322. The projection specification position detector 130 calculates a pointing position P(X, Y, Z) based on intersection determination of the three-dimensional shape of the projection environment that the three-dimensional space recognition unit 120 has acquired and the three-dimensional vector V.

Figure 11:
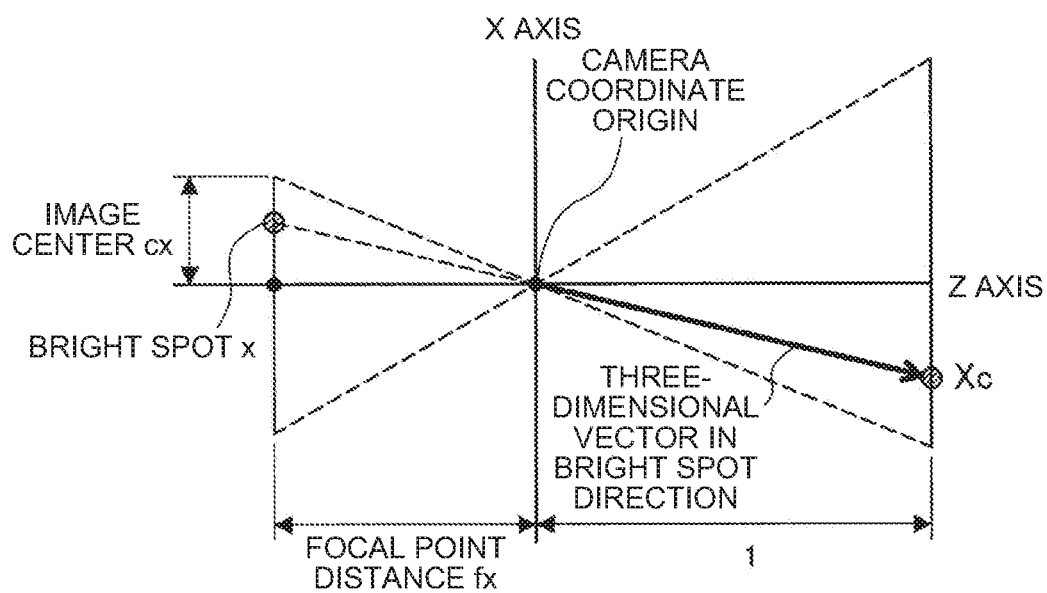
FIG. 11 is a view for explaining a three-dimensional vector from a camera coordinate origin in a bright spot direction in the embodiment.

To be more specific, the pointing position is calculated by the following computation. First, in a camera coordinate system illustrated in FIG. 10, when, as the camera internal parameters, an image center is (cx, cy) and a focal point distance is (fx, fy) as illustrated in FIG. 11, a unit vector for the bright spot coordinates (x, y) is calculated by the following equation 1.

$$\vec{V} = (x_v, y_v, z_v) = \left(\frac{X_c}{D}, \frac{Y_c}{D}, \frac{1}{D}\right) \quad (1)$$

In the above Equation 1

$$D = \sqrt{\left(\frac{x - cx}{fx}\right)^2 + \left(\frac{y - cy}{fy}\right)^2 + 1}$$

In this example, a three-dimensional point projected onto a position with a distance of Z=1 from the origin of the camera coordinate system is $(X_c, Y_c, 1)$. The projection specification position detector 130 performs the intersection determination of the calculated three-dimensional vector and the three-dimensional shape expressed by the camera coordinate system and sets a three-dimensional point at the intersection to $P_{cam}(X_{cam}, Y_{cam}, Z_{cam})$. When a matrix for converting the camera coordinate system to a world coordinate system with a desired point as the origin is RT, the pointing position is finally calculated by the following equation 2. It should be noted that R is a rotation matrix and T is a matrix expressing translation movement.

$$P = RTP_{cam} \quad \text{Equation 2}$$

Thereafter, the state determination unit 150 determines the state of the projection specification position based on the projection specification position detected by the projection specification position detector 130 and the drive boundary determined by the drive boundary determination unit 140 (step S136). In this case, the state determination unit 150 determines the four states as described above in consideration of time-series information of the pointed projection specification position (that is, movement of the projection specification position). The four states to be determined will be explained with reference to FIG. 12.

Figure 12:
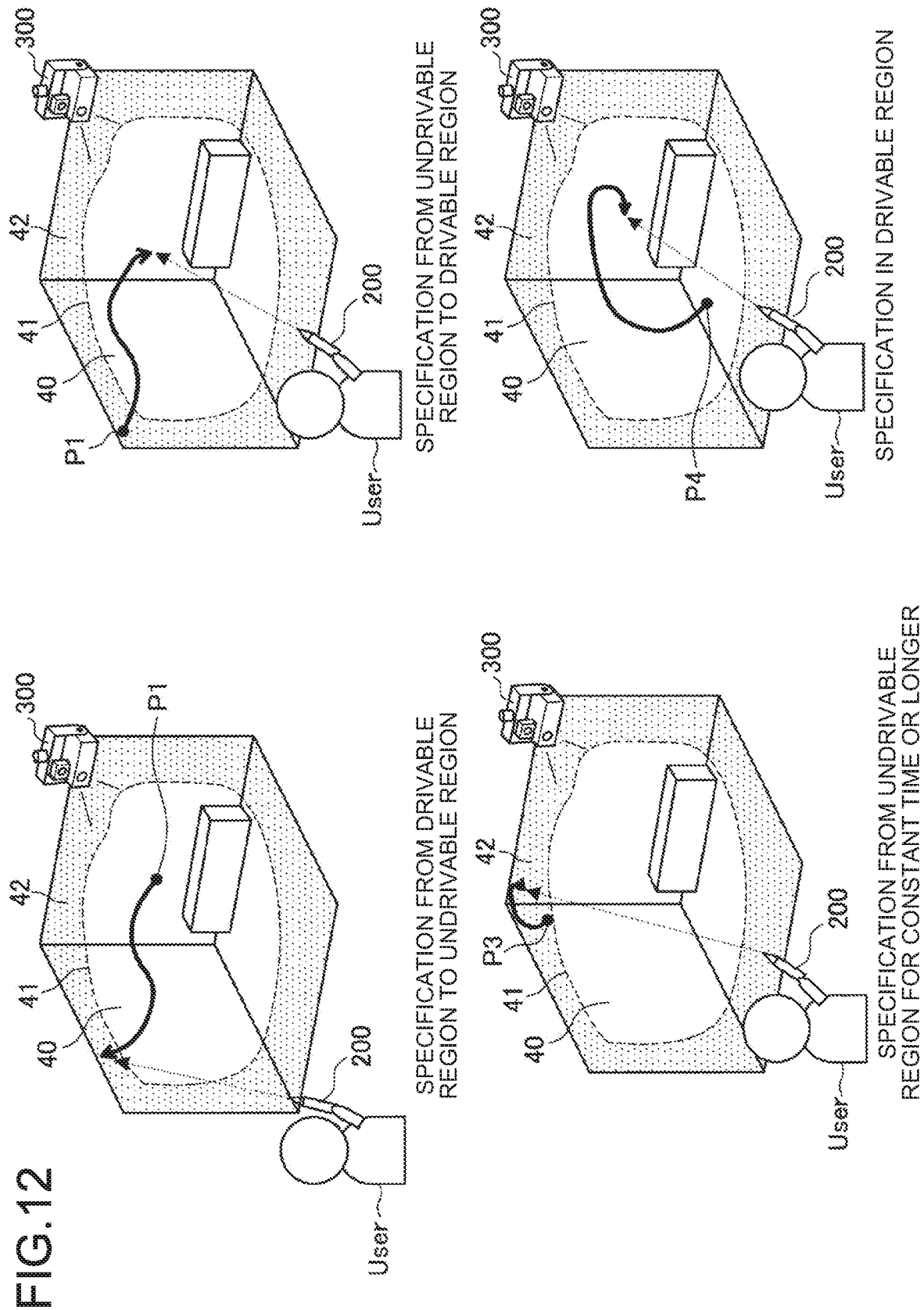
FIG. 12 is a view for explaining determination of a state of the projection specification position in the embodiment.

For example, as illustrated on the upper left side of FIG. 12, the state determination unit 150 determines the state where a pointed projection specification position P1 is moved to the undrivable region 42 from the drivable region 40 (condition that the projection specification position P1 crosses the drive boundary 41) (state 1). As illustrated on the upper right side of FIG. 12, the state determination unit 150 determines a state where a projection specification position P2 is moved to the drivable region 40 from the undrivable region 42 (condition that the projection specification position P2 crosses the drive boundary 41) (state 2). As illustrated on the lower left side of FIG. 12, the state determination unit 150 determines a state where a projection specification position P3 is located in the undrivable region 42 for constant time or longer (state 3). As illustrated on the lower right side of FIG. 12, the state determination unit 150 determines a state where a projection specification position P4 is moved in the drivable region (state 4).

Then, the information processing apparatus 100 performs the feedback processing based on the determination result (step S139). To be specific, in the states 1 to 3, the user possibly specifies the projection position in the undrivable region and it is necessary to cause the user to recognize the boundary of the drivable region. The information processing apparatus 100 therefore causes the user to recognize the boundary of the drivable region by providing predetermined feedback to the user. Specific feedback examples will be described later with reference to FIG. 13 to FIG. 31.

The above-mentioned steps S133 to S139 are repeated until the projection position is determined (step S142). The projection position can be determined by, for example, a predetermined operation, uttered voice, gesture, or the like by the user using the input device 200. The predetermined operation, uttered voice, gesture, or the like by the user is detected by any of the various sensors provided in the input device 200 and is transmitted to the information processing apparatus 100. Alternatively, the information processing apparatus 100 may detect, using the sensor 320 of the drive-type projector 300, change (flashing, movement, or the like that can be changed based on a user operation) of the infrared light emitted by the input device 200 to recognize determination of the projection position.

4. FEEDBACK EXAMPLES

Next, examples of the feedback for causing the user to recognize the boundary of the drivable region in the embodiment will be specifically described with reference to FIG. 13 to FIG. 31. The information processing apparatus 100 in the embodiment performs feedback control of intensifying a predetermined effect and so on as the projection specification position becomes closer to the drive boundary, for example, based on the distance from the projection specification position to the drive boundary, the positional relation therebetween, the movement of the projection specification position crossing the drive boundary, and the like.

<4-1. Feedback in Specification from Drivable Region to Undrivable Region>

First, a feedback example when the user moves the projection specification position from the drivable region to the undrivable region will be described.

(4-1-1. Expression by Pointer)

FIG. 13 to FIG. 16 illustrate examples in which feedback is performed by rendering (projecting) a pointer onto a projection specification position specified by the user and applying an effect to the rendered pointer. In FIG. 13 to FIG. 16, the pointer is expressed by a circle, the embodiment is, however, not limited thereto. The pointer may be expressed by a sight or an arrow cursor.

Figure 13:
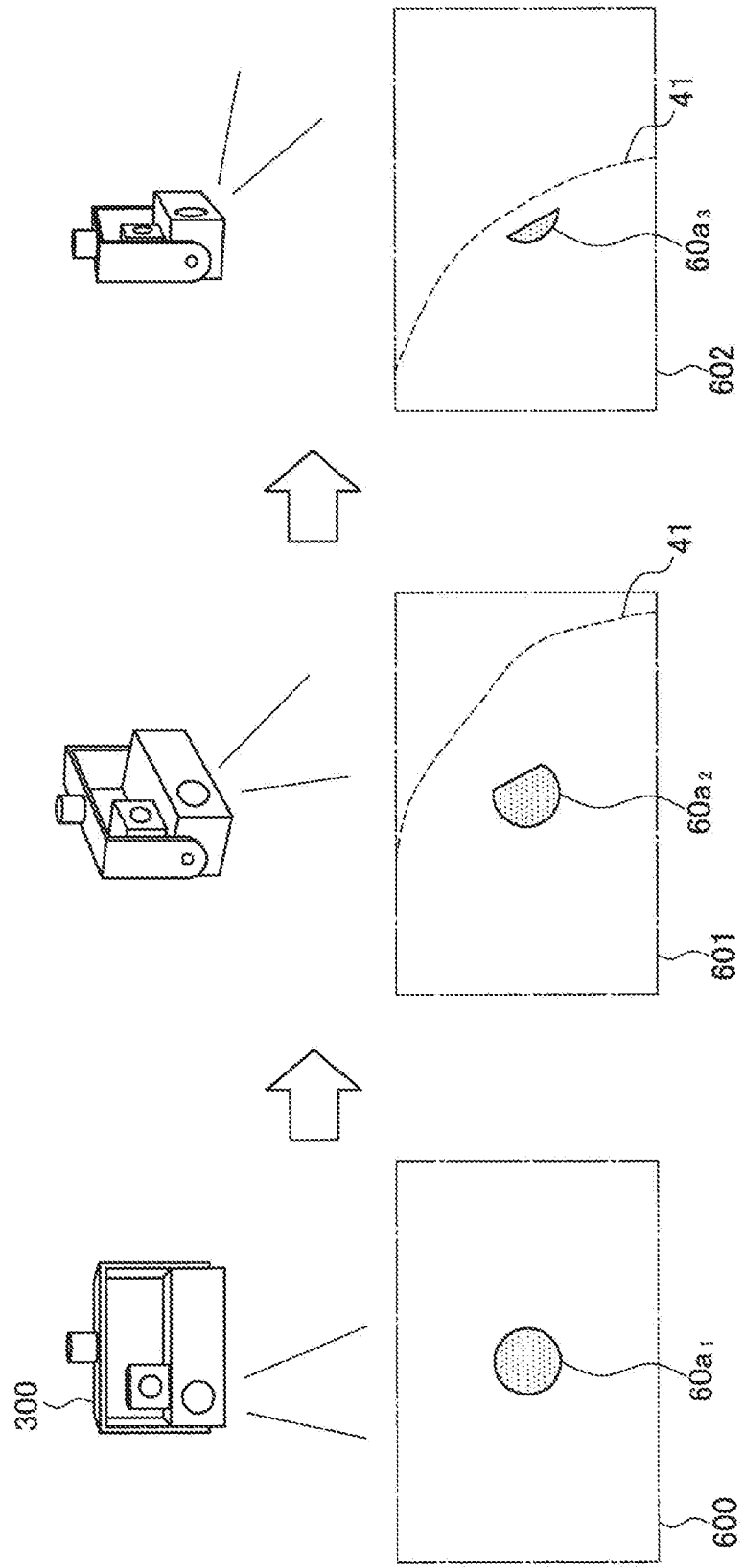
FIG. 13 is a view for explaining a feedback example in the embodiment.

As illustrated in FIG. 13, the information processing apparatus 100 performs feedback of applying an effect that a pointer 60a gradually wanes as it is close to the drive boundary 41. To be specific, first, as illustrated on the left side of FIG. 13, the drive-type projector 300 projects a projection image 600 in which a pointer $60a_1$ is rendered at the projection specification position specified with the input device 200 by the user. Then, when the user moves the input device 200 to move the projection specification position, the information processing apparatus 100 drives the drive-type projector 300 such that a rendering position of the pointer $60a_1$ in the projection image 600 follows the projection specification position. Subsequently, as illustrated in the center of FIG. 13 and the right side of FIG. 13, the information processing apparatus 100 proposes the expression that a pointer 60a2 gradually wanes as the pointer $60a_2$ is close to the drive boundary 41. That is to say, the information processing apparatus 100 performs feedback control of intensifying the effect that the pointer 60a wanes as the projection specification position becomes closer to the drive boundary 41. With this feedback control, even when the drive boundary 41 is not clearly expressed, the waning degree of the pointer 60a enables the user to recognize that the projection specification position is close to the drive boundary 41 and intuitively grasp the place of the drive boundary 41.

Figure 14:
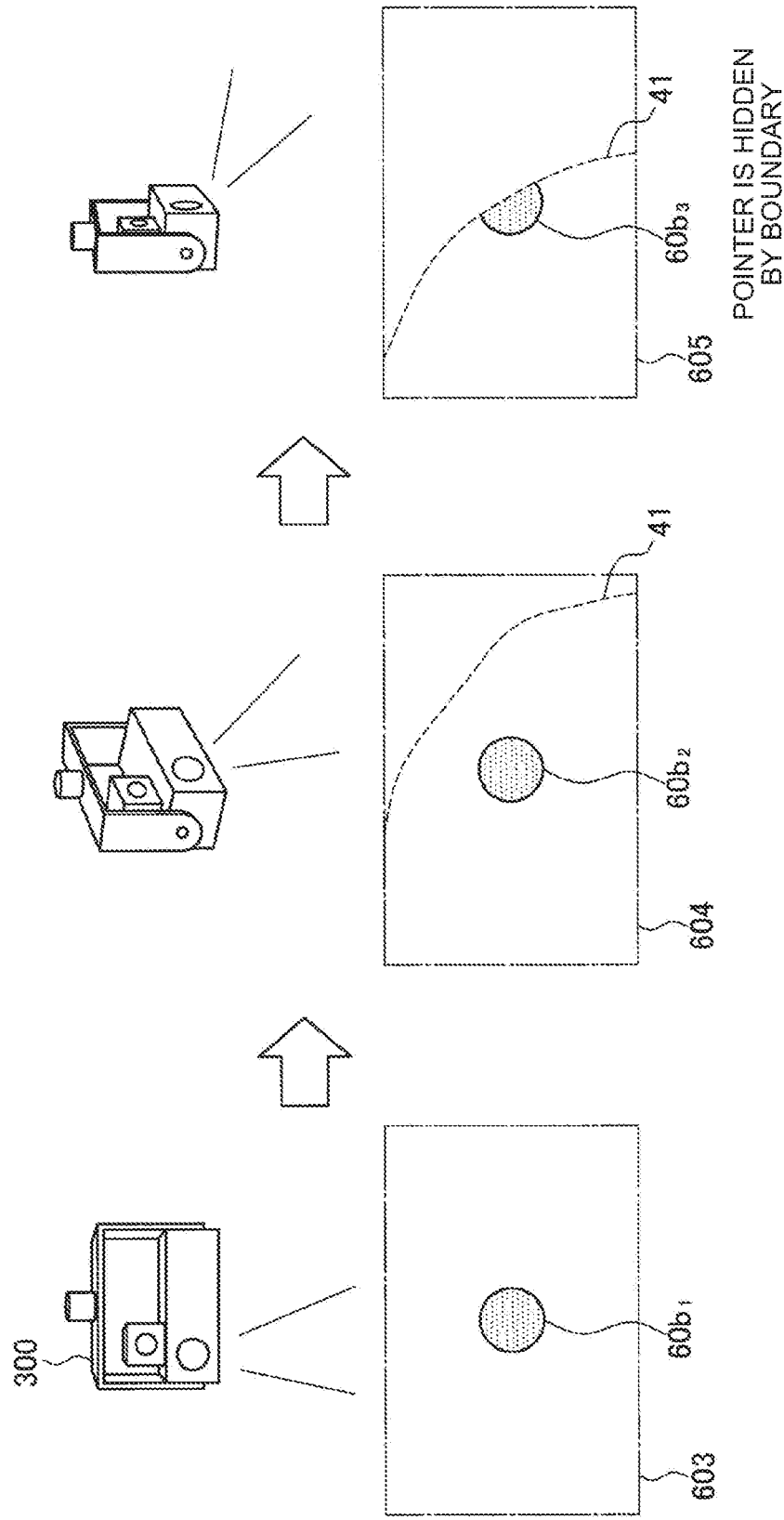
FIG. 14 is a view for explaining another feedback example in the embodiment.

As illustrated in FIG. 14, the information processing apparatus 100 may perform feedback of applying an effect that a pointer 60b is hidden by the drive boundary 41. To be specific, as indicated by projection images 603 to 605 in FIG. 14, when the pointer 60b reaches the drive boundary 41 as illustrated on the right side of FIG. 14 in rendering the pointer 60b at the projection specification position specified with the input device 200 by the user, the expression that the pointer 60b is not displayed on the outside of the drive boundary 41 (as if a part of which is hidden by the drive boundary 41) is made. Also in this case, even when the drive boundary 41 is not clearly expressed, the hidden degree of the pointer 60b enables the user to intuitively grasp the place of the drive boundary.

Figure 15:
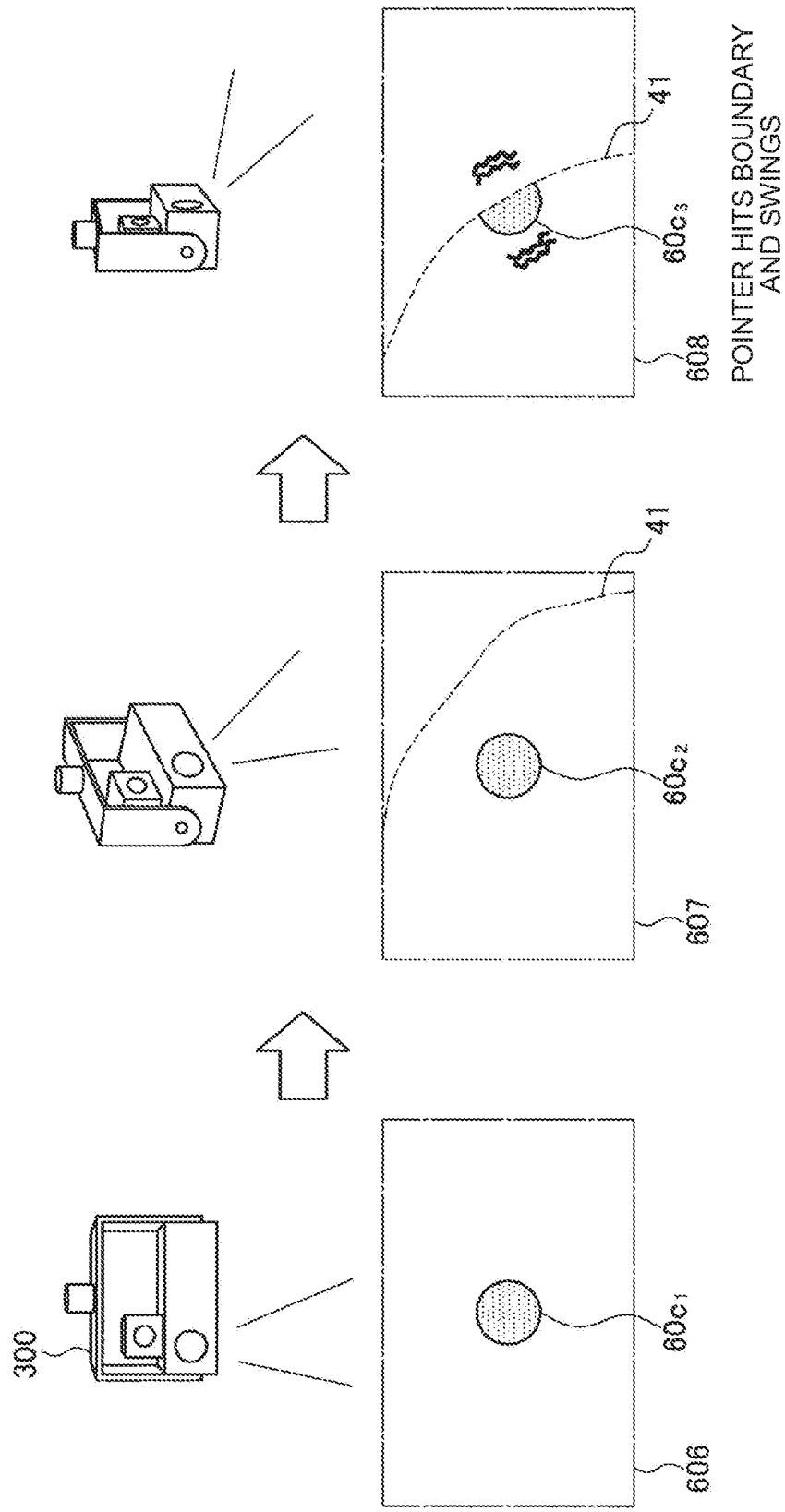
FIG. 15 is a view for explaining still another feedback example in the embodiment.

As illustrated in FIG. 15, the information processing apparatus 100 may perform feedback of applying an effect that a pointer 60c swings when the pointer 60c hits the drive boundary 41. To be specific, as indicated by projection images 606 to 608 in FIG. 15, when the pointer 60c hits the drive boundary 41 as illustrated on the right side of FIG. 15 in rendering the pointer 60c at the projection specification position specified with the input device 200 by the user, the expression that the pointer 60c is hidden by the drive boundary 41 and swings is made. With this feedback control, even when the drive boundary 41 is not clearly expressed, the swinging degree of the pointer 60c enables the user to intuitively grasp the place of the drive boundary 41.

Figure 16:
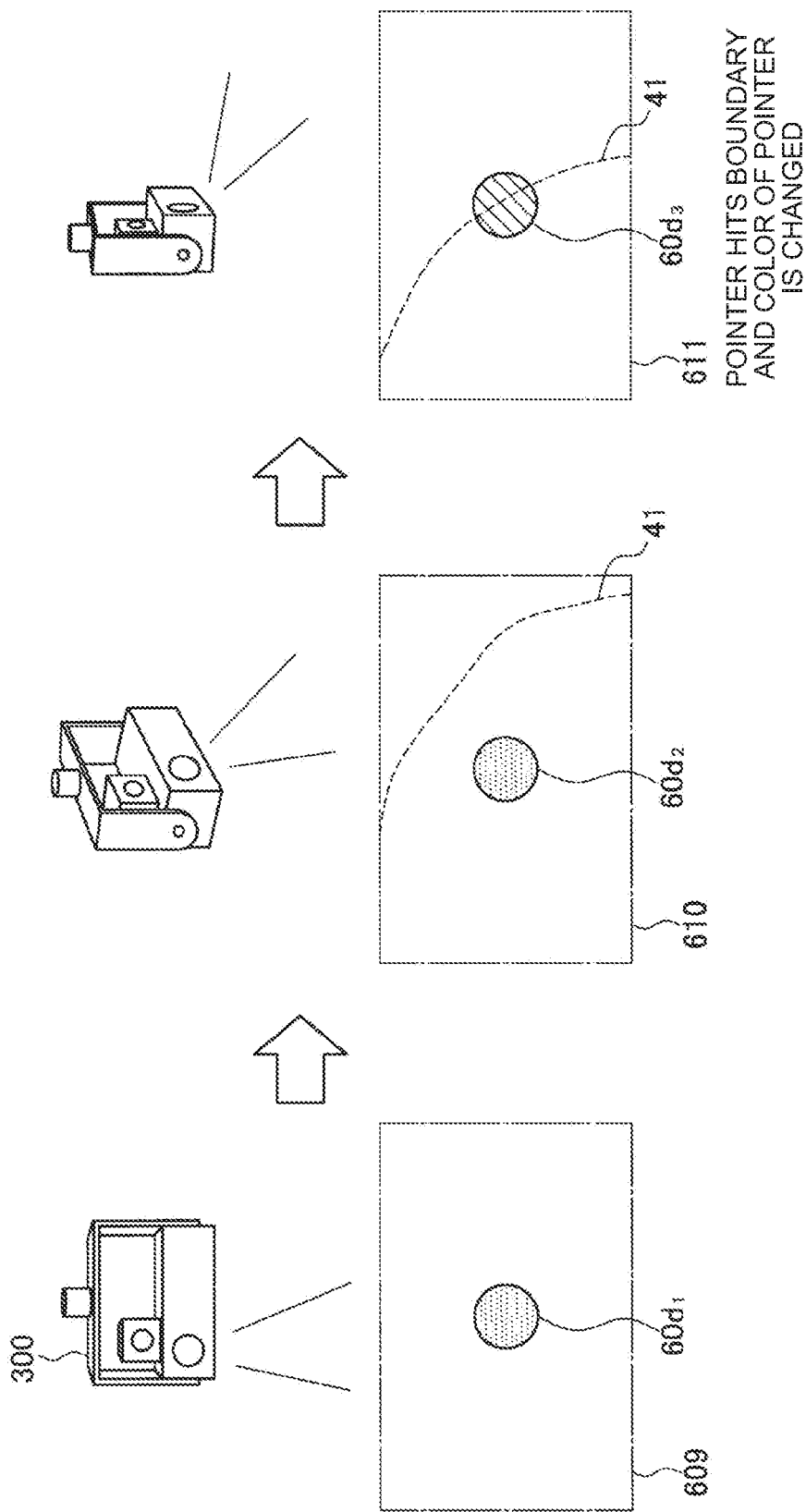
FIG. 16 is a view for explaining still another feedback example in the embodiment.

As illustrated in FIG. 16, the information processing apparatus 100 may perform feedback of applying an effect that the color of a pointer 60d changes when the pointer 60d hits the drive boundary 41. To be specific, as indicated by projection images 609 to 611 in FIG. 16, when the pointer 60d hits the drive boundary 41 as illustrated on the right side of FIG. 16 in rendering the pointer 60d at the projection specification position specified with the input device 200 by the user, the expression that the color of the pointer 60c is changed is made. With this feedback control, even when the drive boundary 41 is not clearly expressed, change in the color of the pointer 60d enables the user to intuitively grasp the place of the drive boundary 41. Although the expression that the color of the pointer 60d is changed is employed in this example, the embodiment is not limited thereto. The size or shape of the pointer 60d may be changed, the pointer 60d may be made to flash, or sound may be emitted.

The information processing apparatus 100 may employ the expression that a pointer rebounds on the drive boundary. Alternatively, the expression may be employed that when the pointer is close to the drive boundary, the speed thereof is decreased or increased so as to be attracted to the drive boundary as if magnetic force acts thereon.

(4-1-2. Expression with Content)

FIG. 17 to FIG. 20 illustrate examples in which feedback is performed by rendering (projecting) a content onto a projection specification position specified by the user and applying an effect to the rendered content.

Figure 17:
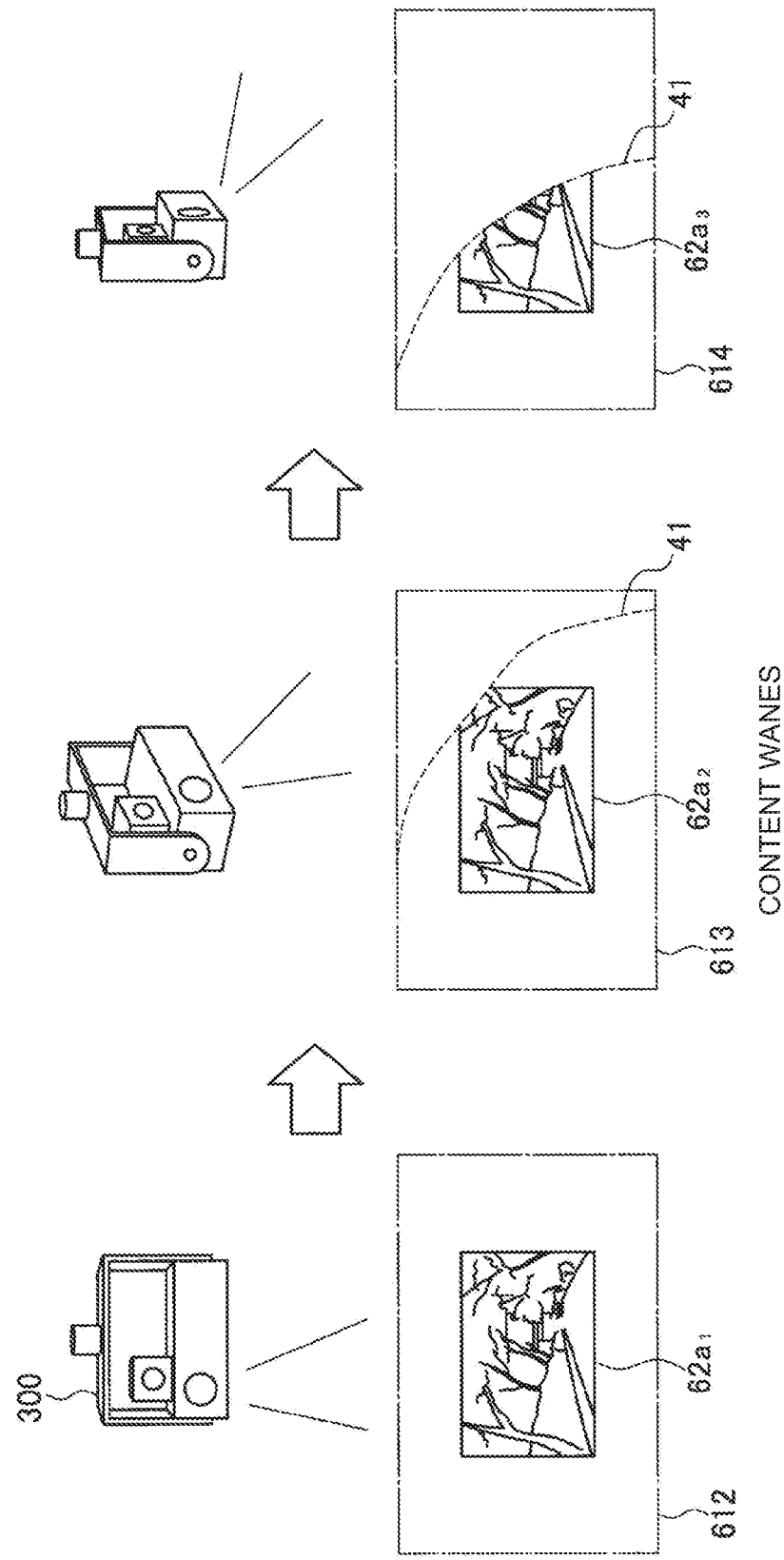
FIG. 17 is a view for explaining still another feedback example in the embodiment.

As illustrated in FIG. 17, the information processing apparatus 100 performs feedback of applying an effect that a content 62a gradually disappears as it reaches the drive boundary 41, for example. To be specific, as indicated by projection images 612 to 614 in FIG. 17, when the content 62a reaches the drive boundary 41 as illustrated on the right side of FIG. 17 in rendering the content 62a at the projection specification position specified with the input device 200 by the user, the expression that the content 62a is not displayed on the outside of the drive boundary 41 (as if a part of which is hidden by the drive boundary 41) is made. With this feedback control, even when the drive boundary 41 is not clearly expressed, the hidden degree of the content 62a enables the user to intuitively grasp the place of the drive boundary 41.

Figure 18:
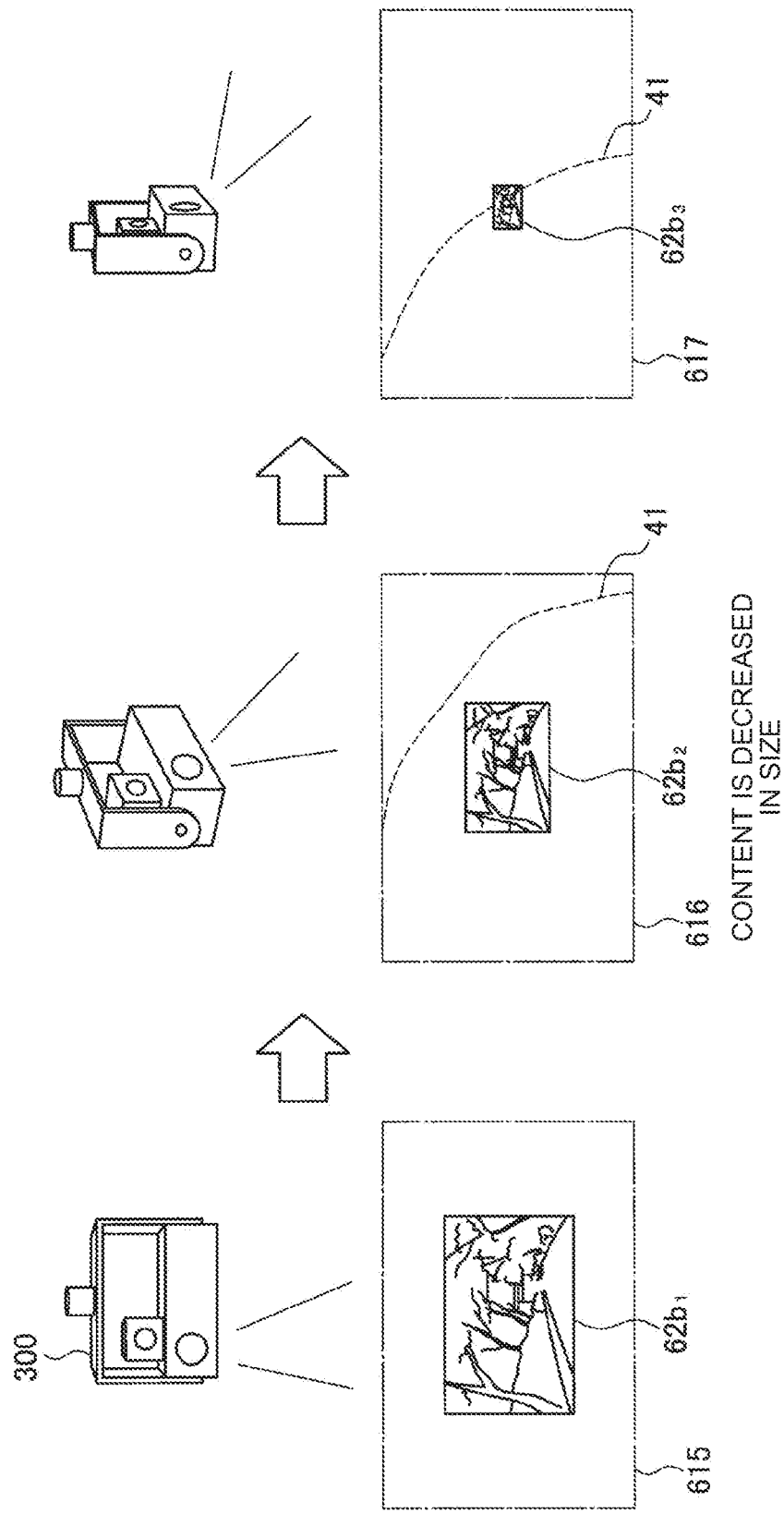
FIG. 18 is a view for explaining still another feedback example in the embodiment.

As illustrated in FIG. 18, the information processing apparatus 100 may perform feedback of applying an effect that a content 62b is decreased in size when it is close to the drive boundary 41. To be specific, as indicated by projection images 615 to 617 in FIG. 18, when the content 62b is close to the drive boundary 41 as illustrated in the center of FIG. 18 and the right side of FIG. 18 in rendering the content 62b at the projection specification position specified with the input device 200 by the user, the expression that the content 62b is gradually decreased in size is made. That is to say, the information processing apparatus 100 performs feedback control of intensifying the effect that the content 62b is decreased in size as the projection specification position becomes closer to the drive boundary 41. With this feedback control, even when the drive boundary 41 is not clearly expressed, change in the display size of the content 62b enables the user to intuitively grasp the place of the drive boundary 41.

Figure 19:
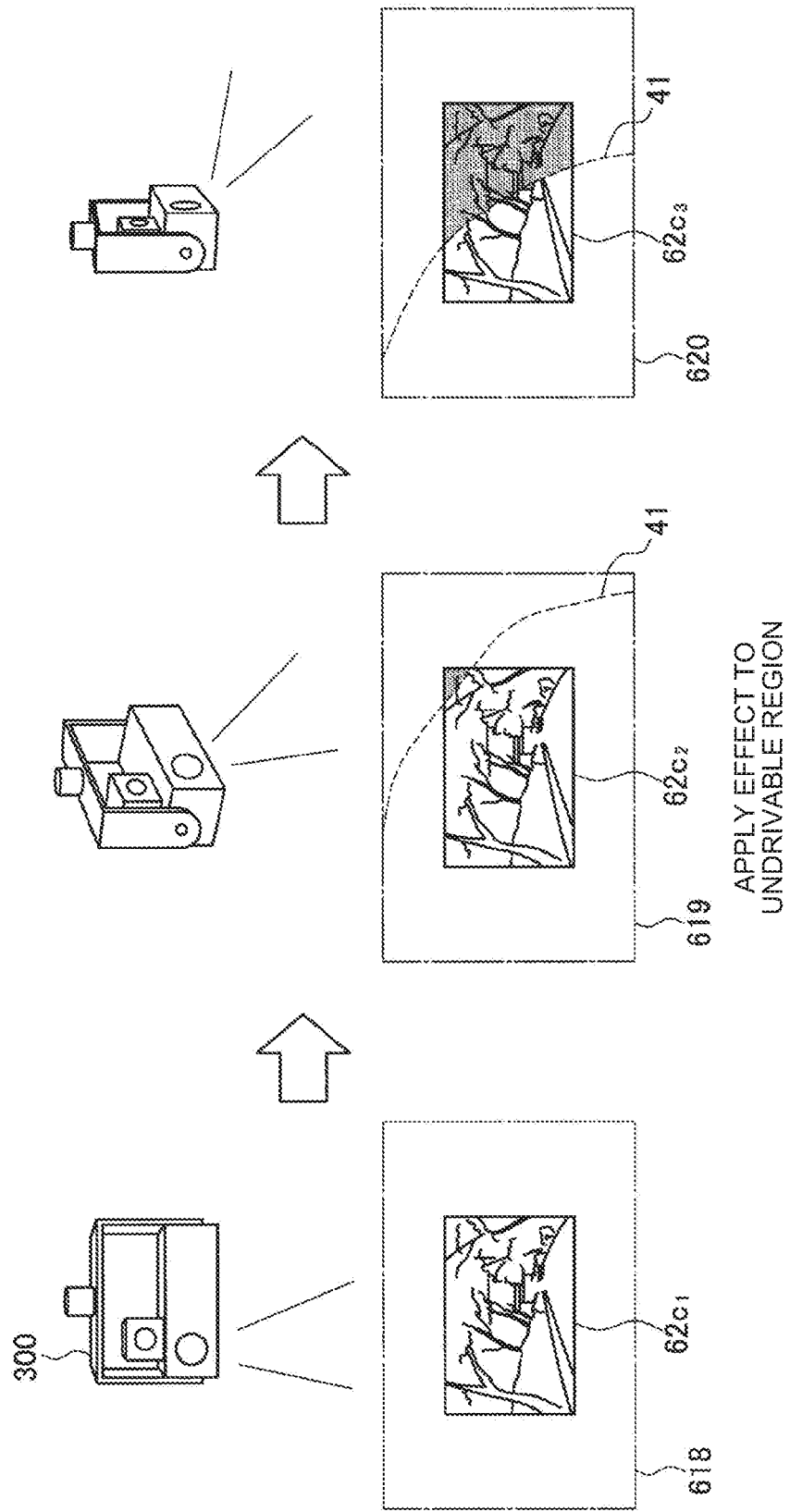
FIG. 19 is a view for explaining still another feedback example in the embodiment.

As illustrated in FIG. 19, the information processing apparatus 100 may perform feedback of applying an effect to a portion of a region of a content 62c that protrudes outside the drive boundary 41. To be specific, as indicated by projection images 618 to 620 in FIG. 19, the information processing apparatus 100 applies an effect of giving shading, lowering brightness, changing a color tone or lightness, and so on to the portion of the region of the content 62c that protrude outside the drive boundary 41 (that is, a portion of the undrivable region) as illustrated in the center of FIG. 19 and the right side of FIG. 19 in rendering the content 62c at the projection specification position specified with the input device 200 by the user. The region to which the above-mentioned effect is applied is increased as the projection specification position becomes closer to the drive boundary 41 (because the portion protruding outside the drive boundary 41 is increased). With this feedback control, even when the drive boundary 41 is not clearly expressed, display change of the content 62c enables the user to intuitively grasp the place of the drive boundary 41.

Figure 20:
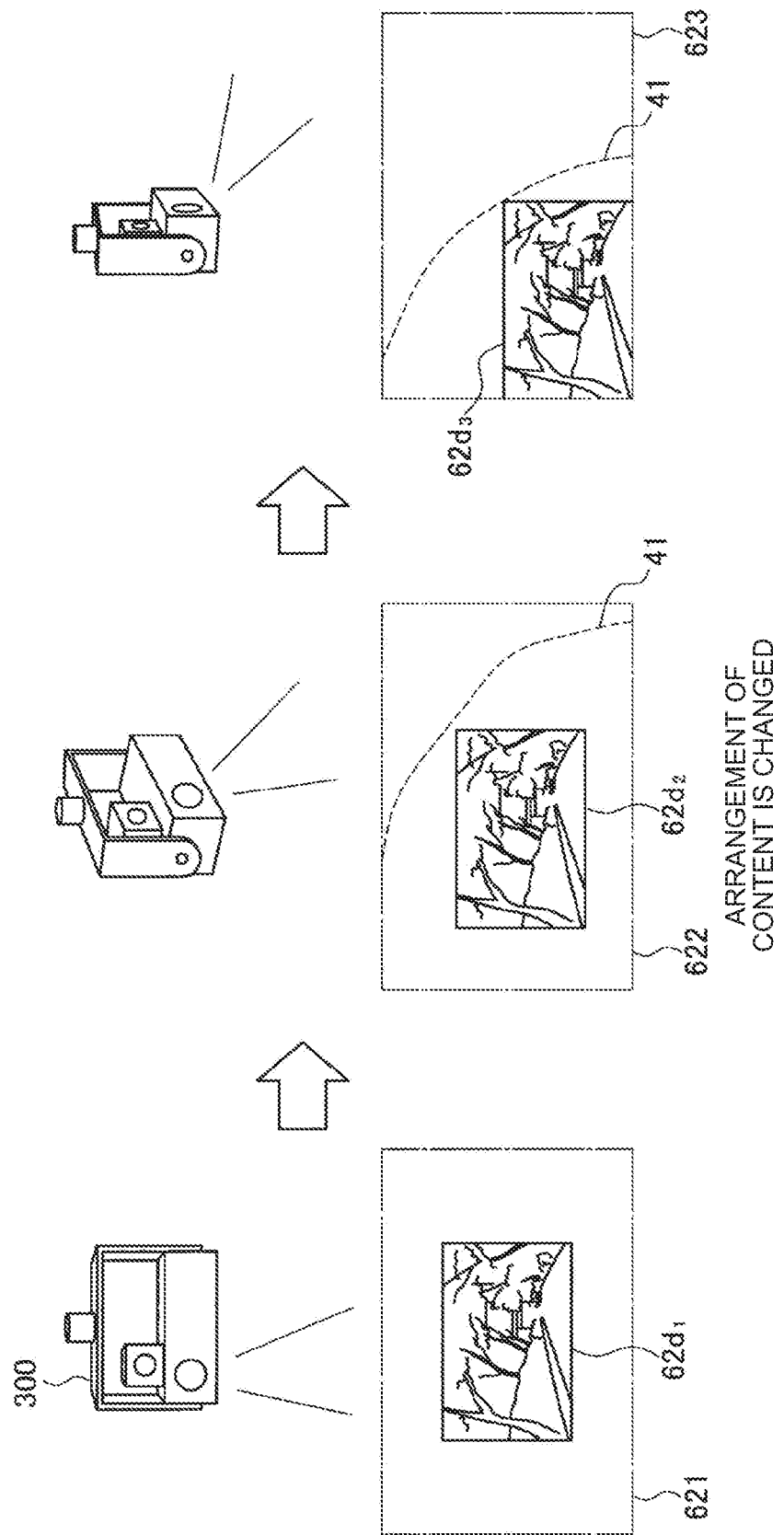
FIG. 20 is a view for explaining still another feedback example in the embodiment.

As illustrated in FIG. 20, the information processing apparatus 100 may perform feedback of changing a rendering position of a content 62d in a projection image such that the content 62d does not protrude outside the drive boundary when the content 62d is close to the drive boundary 41. To be specific, as indicated by projection images 621 to 623 in FIG. 20, the information processing apparatus 100 shifts arrangement of the content 62d, which is initially arranged at the center in the projection image, in the projection image as illustrated in the center of FIG. 20 and the right side of FIG. 20 such that the content 62d does not protrude outside the drive boundary 41 in rendering the content 62d at the projection specification position specified with the input device 200 by the user. With this feedback control, even when the user attempts to move the content 62d, the content 62d cannot be moved to the outside of a predetermined boundary (the drive boundary 41 that is not clearly expressed), so that the user can intuitively grasp the place of the drive boundary 41.

Figure 21:
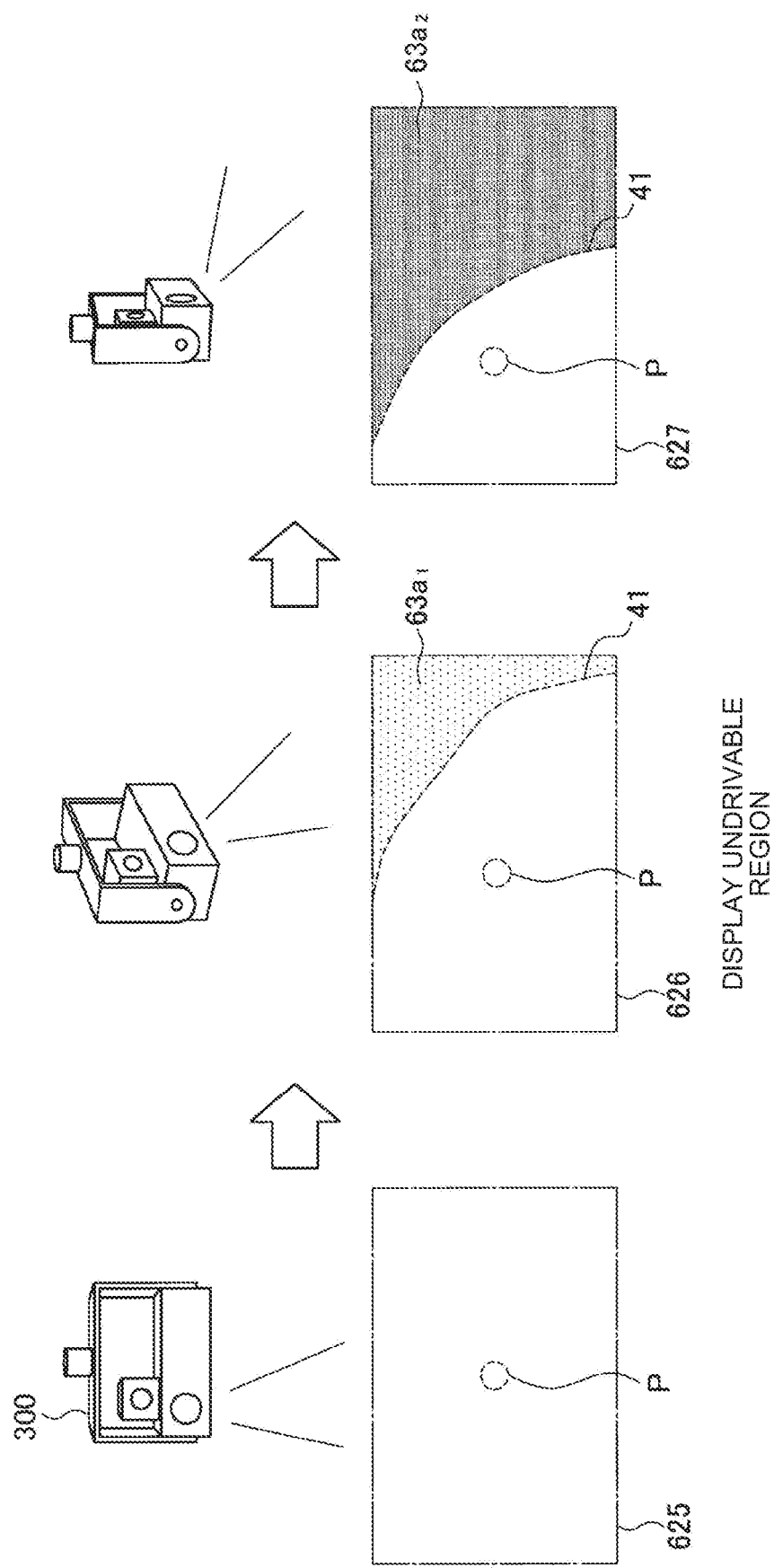
FIG. 21 is a view for explaining still another feedback example in the embodiment.

As indicated by projection images 625 to 627 in FIG. 21, the undrivable region may be displayed by fill drawing or the like. To be specific, the information processing apparatus 100 displays the undrivable region by fill drawing or the like when the undrivable region is included in a projection field angle corresponding to the projection specification position P (pointer rendering may or may not be made) as indicated by projection images 625 to 627 in FIG. 21. The information processing apparatus 100 performs feedback of intensifying the display effect as the projection specification position P becomes closer to the drive boundary 41, thereby enabling the user to intuitively grasp the place of the drive boundary 41.

Hereinbefore, the specific examples of the effect that is applied to the pointer or content have been described. The above-mentioned effects may be combined. The information processing apparatus 100 may apply, for example, the effect that the pointer or content displayed at the projection specification position is decreased in size as the projection specification position becomes closer to the drive boundary 41 and the effect that the pointer or content swings when hitting the drive boundary 41.

Furthermore, the above-mentioned effects can also be combined with expression with sound or expression with driving, which will be described next.

(4-1-3. Expression with Sound)

The information processing apparatus 100 may perform feedback with sound by reproducing an alert tone from the ultrasonic speaker 312 or the speaker 313 of the drive-type projector 300 or increasing the volume of the alert tone when the projection specification position is close to the drive boundary, reproducing an effect sound when the projection specification position hits the drive boundary, and so on.

(4-1-4. Expression with Driving)

Figure 22:
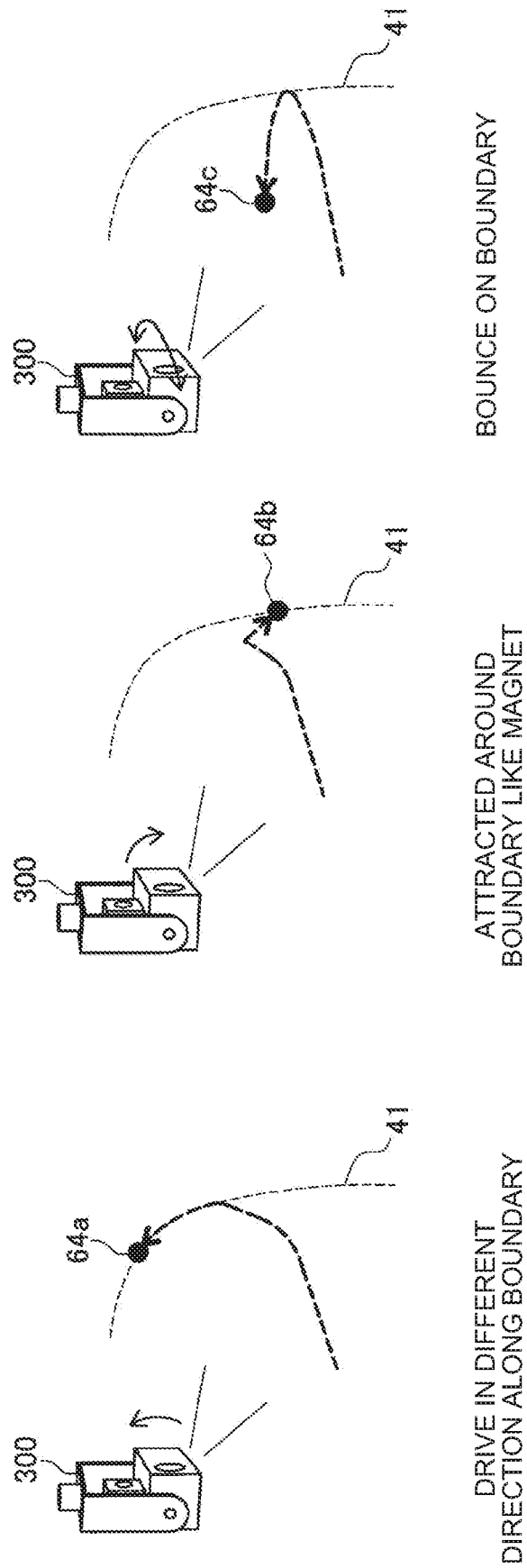
FIG. 22 is a view for explaining still another feedback example in the embodiment.

The information processing apparatus 100 may express feedback with movement of the drive-type projector 300. For example, as illustrated on the left side of FIG. 22, the information processing apparatus 100 may inertially drive the drive-type projector 300 in the direction along the drive boundary (in this case, a pointer 64a rendered at the center in the projection field angle looks like moving in the direction along the drive boundary) when the projection specification position moves to the outside of the drive boundary (to the undrivable region). Alternatively, as illustrated in the center of FIG. 22, the information processing apparatus 100 may drive the drive-type projector 300 such that the projection specification position is attracted to the drive boundary like a magnet (in this case, a pointer 64b rendered at the center in the projection field angle looks like moving so as to be attracted to the drive boundary like a magnet, for example) when the projection specification position is close to the drive boundary. As illustrated on the right side of FIG. 22, the information processing apparatus 100 may drive the drive-type projector 300 such that the projection specification position bounces on the drive boundary (in this case, the pointer 64c rendered at the center in the projection field angle looks like bouncing on the drive boundary) when the projection specification position hits the drive boundary. With these feedback controls, even when the drive boundary 41 is not clearly expressed, the movement of the drive-type projector 300 (in addition thereto, movements of the pointers 64a to 64c) enables the user to intuitively grasp the place of the drive boundary.

In an example illustrated in FIG. 22, the information processing apparatus 100 may additionally display trajectories of the movements of the pointers 64a to 64c in the vicinity of the drive boundary.

(4-1-5. Distance to Drive Boundary)

Each of the expressions (effects) described above with reference to FIG. 13 to FIG. 22 is changed in accordance with a distance between a position pointed by the user (projection specification position P: pointing position coordinates) and the drive boundary 41, for example. FIG. 23 is a view for explaining the distance between the pointing position (projection specification position P) and the drive boundary 41 in the embodiment. As illustrated on the left side of FIG. 23, a distance when the projection specification position P moves to the undrivable region from the drivable region is, for example, a distance d1 (which may be the shortest) between the projection specification position P and the drive boundary 41 in the vicinity thereof. A distance when the projection specification position P moves to the drivable region from the undrivable region as will be described next is also, for example, a shortest distance d2 between the projection specification position P and the drive boundary 41.

For example, as for display of the undrivable region as illustrated in FIG. 21, the information processing apparatus 100 may increase the concentration of a display color of the undrivable region as the above-mentioned distance d1 is decreased. Furthermore, as for the display of the undrivable region as illustrated in FIG. 21, the information processing apparatus 100 may change transmittance in accordance with the distance (for example, the display color of the undrivable region may be made clear as the projection specification position P becomes closer to the drive boundary). Thus, the information processing apparatus 100 controls the intensity of the effect that is applied to the image of the pointer, the content, or the like in accordance with the distance between the projection specification position and the drive boundary (boundary of the drivable region). To be specific, when the projection specification position is located in the drivable region, the information processing apparatus 100 intensifies the effect that is applied to the image of the pointer, the content, or the like as the distance between the projection specification position and the drive boundary is decreased (see FIG. 13 to FIG. 22).

<4-2. Feedback in Specification from Undrivable Region to Drivable Region>

Next, a feedback example when the user moves the projection specification position from the undrivable region to the drivable region will be described.

Figure 24:
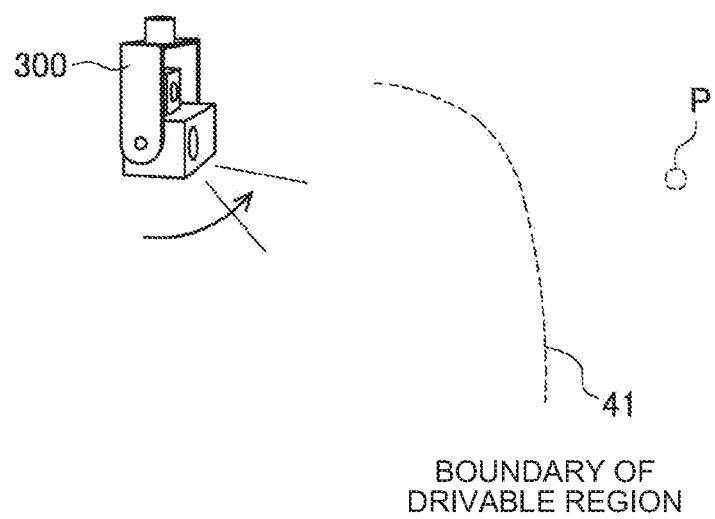
FIG. 24 is a view for explaining a feedback example in the embodiment.

First, as illustrated in FIG. 24, the information processing apparatus 100 drives the drive-type projector 300 to the drivable region when the projection specification position P is specified on the outside of the drive boundary 41, that is, in the undrivable region. Subsequently, the information processing apparatus 100 proposes feedback of urging the user to move the projection specification position P from the undrivable region to the drivable region.

As illustrated on the left side of FIG. 25, for example, the information processing apparatus 100 displays an image 630 indicating a bird's-eye view map of the projection environment, the drivable region, and a trajectory of positions pointed by the user. With the display, the user can recognize that he/she is about to determine the projection specification position in the vicinity of the drive boundary and be conscious of specifying it in the drivable region. As illustrated on the right side of FIG. 25, the information processing apparatus 100 may display an image 631 provided by being converted into a bird's-eye view map from the viewpoint of the user in order for the user to facilitate understanding.

Figure 26:
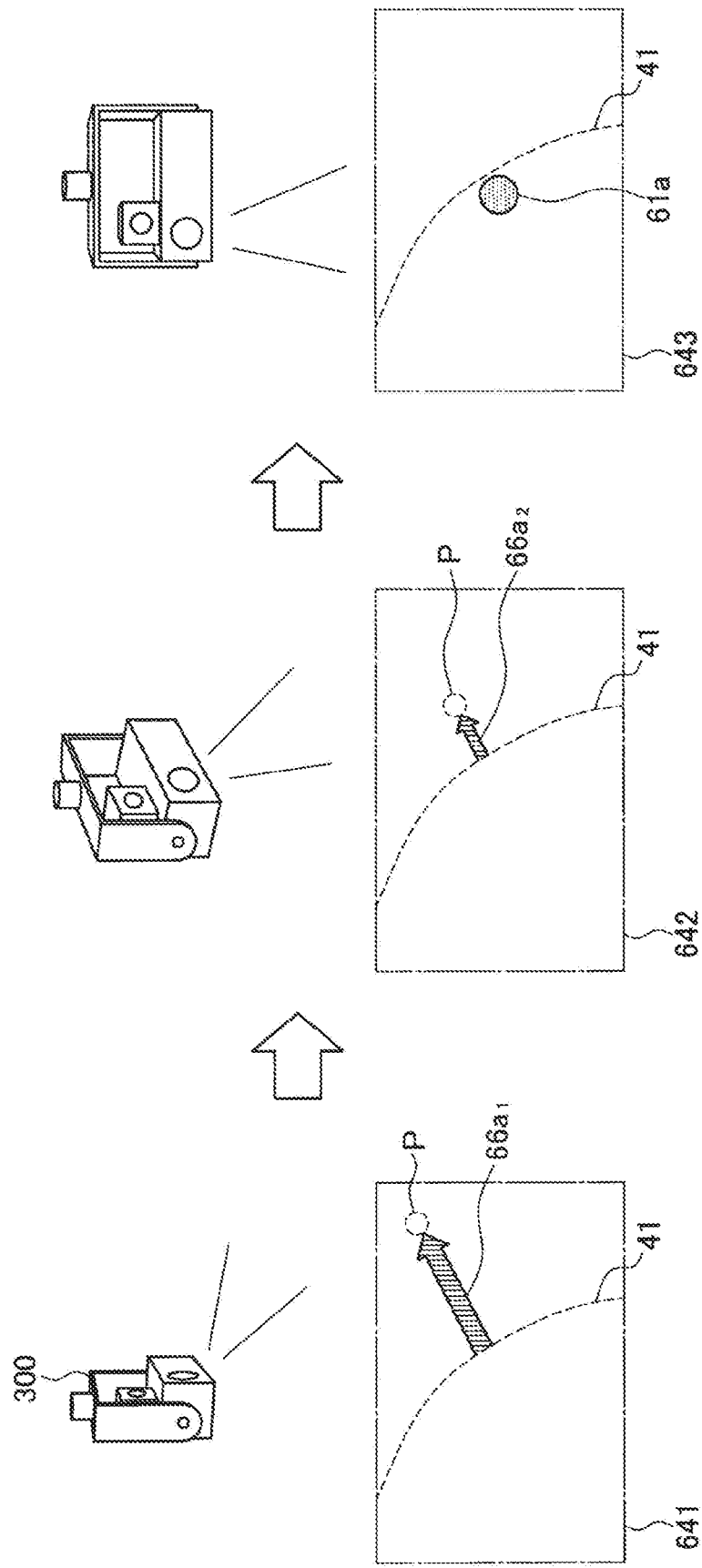
FIG. 26 is a view for explaining still another feedback example in the embodiment.

As illustrated in FIG. 26, the information processing apparatus 100 may display the pointing direction with a vector 66a for the projection specification position P located outside the drive boundary 41 (undrivable region). In this case, no pointer corresponding to the projection specification position P located outside the drive boundary is displayed, and a pointer 61a is displayed as illustrated on the right side of FIG. 26 when the projection specification position P is moved into the drive boundary. With the display, the user can be urged to move the projection specification position P from the undrivable region to the drivable region.

Figure 27:
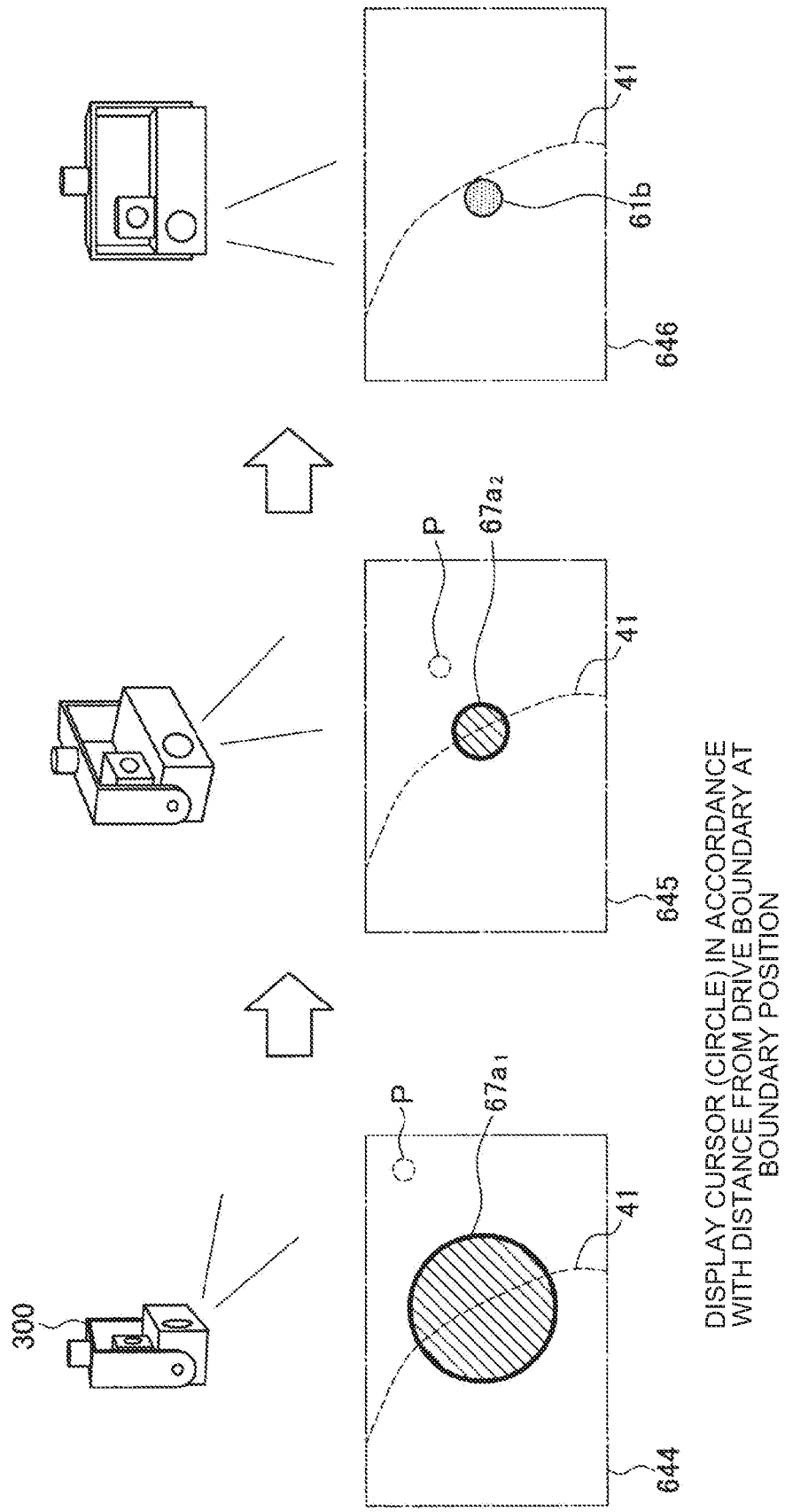
FIG. 27 is a view for explaining still another feedback example in the embodiment.

As illustrated in FIG. 27, the information processing apparatus 100 may display, in the direction of the projection specification position P on the drive boundary, a cursor 67a (for example, a circle) having a size in accordance with the shortest distance d2 (see FIG. 23) for the projection specification position P located outside the drive boundary 41 (undrivable region). The size of the cursor 67a is increased as the shortest distance d2 is increased. In this case, no pointer corresponding to the projection specification position P located outside the drive boundary is displayed, and a pointer 61b is displayed as illustrated on the right side of FIG. 27 when the projection specification position P is moved into the drive boundary. With the display, the user can be urged to move the projection specification position P from the undrivable region to the drivable region. The cursor 67a in accordance with the shortest distance d2 is not limited to change in size and may be changed in color tone (hue, concentration, transmittance) (for example, it becomes darker as the shortest distance d2 is increased) or shape (for example, the shape thereof is changed as the shortest distance d2 is increased), flashing (for example, it flashes frequently as the shortest distance d2 is increased), movement (for example, it swings largely as the shortest distance d2 is increased), or the like.

Figure 28:
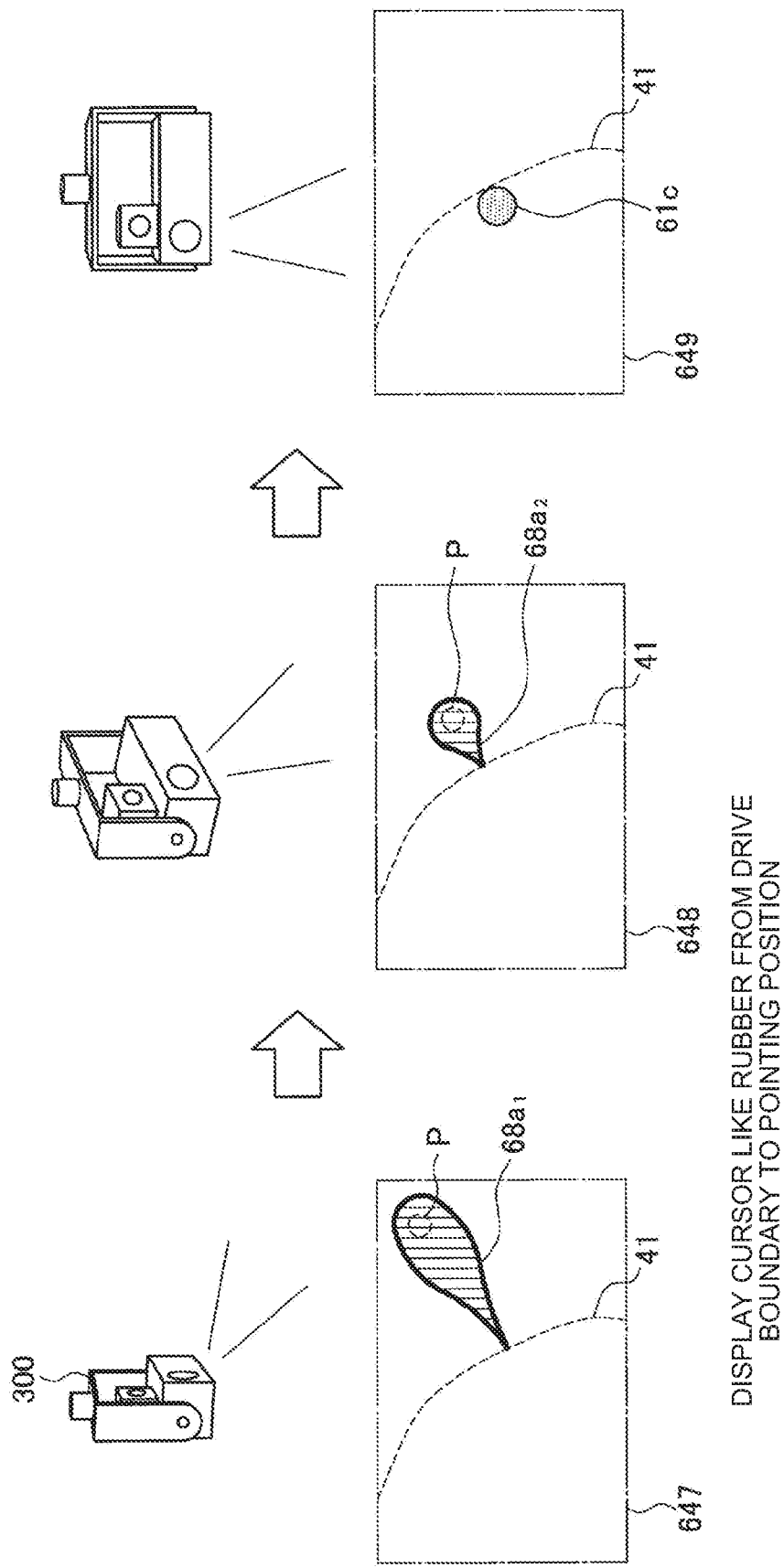
FIG. 28 is a view for explaining still another feedback example in the embodiment.
Figure 29:
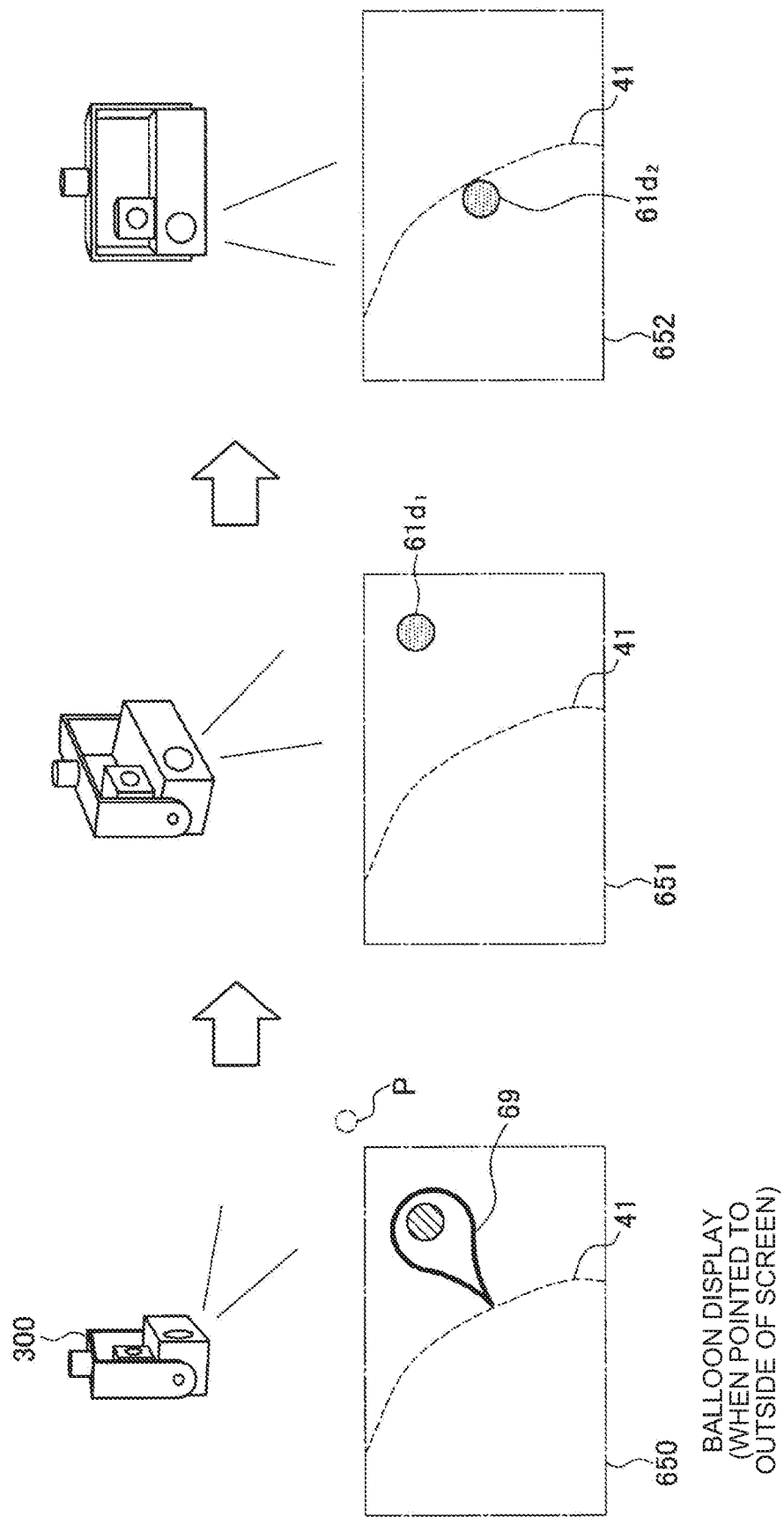
FIG. 29 is a view for explaining still another feedback example in the embodiment.

As illustrated in FIG. 28, the information processing apparatus 100 may display a cursor 68a extending like rubber to the projection specification position P from the drive boundary 41. When the projection specification position P is pointed to the outside of the projection field angle, the information processing apparatus 100 may perform expression by balloon display 69 directing to the pointing direction from the drive boundary 41 as illustrated on the left side of FIG. 29. When the projection specification position P is moved to the outside of the projection field angle, the information processing apparatus 100 may display a pointer 61d at a pointing position as illustrated in the center of FIG. 29 and the right side of FIG. 29. With the display, the user can be urged to move the projection specification position P from the undrivable region to the drivable region.

<4-3. Feedback in Specification for Constant Time or Longer in Undrivable Region>

Subsequently, a feedback example when the user continuously specifies the undrivable region for constant time or longer will be described.

As illustrated in the left side of FIG. 30, for example, the information processing apparatus 100 displays an image 632 indicating the bird's-eye view map of the projection environment, the drivable region, and the trajectory of the positions pointed by the user. With the display, the user can intuitively grasp that he/she is about to determine the projection specification position on the outside of the drivable region (that is, in the undrivable region). As illustrated on the right side of FIG. 30, the information processing apparatus 100 may display an image 633 provided by being converted into the bird's-eye view map from the viewpoint of the user in order for the user to facilitate understanding.

Figure 31:
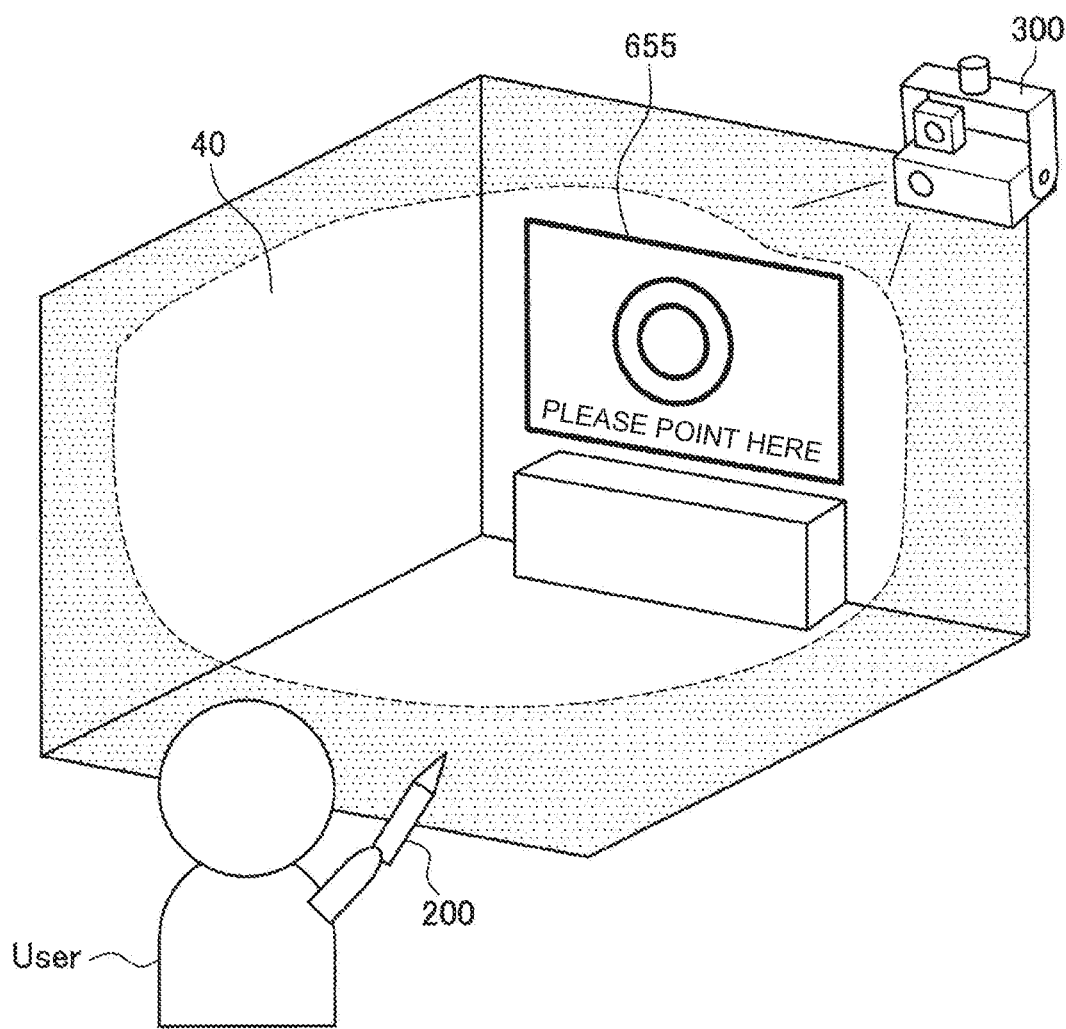
FIG. 31 is a view for explaining still another feedback example in the embodiment.

As illustrated in FIG. 31, the information processing apparatus 100 may display a UI image 655 for urging the user to perform pointing in the drivable region 40 regardless of the pointing position by the user. Text "Please point here" indicated in the UI image 655 may be provided by sound.

5. APPLICATION EXAMPLES

<5-1. Feedback to Input Device>

Although the above-mentioned embodiment mainly describes the feedback (expression with the sound, image, or driving) using the drive-type projector 300, the feedback may be performed by the input device 200 in addition thereto. For example, a vibrator for tactile sensation presentation may be incorporated into the input device 200 and be made to vibrate at timing when the projection specification position P is close to the vicinity of the boundary. Furthermore, an LED (visible light) may be provided in the input device 200 and be made to light or flash at timing when the projection specification position P is close to the vicinity of the boundary. Also in the case in which the input device 200 is a terminal such as a smartphone, feedback can be similarly performed in combination with another modal.

<5-2. Feedback Using Plurality of Drive-type Projectors>

Under an environment in which the drive-type projectors 300 are installed, feedback using the drive-type projectors may be performed. In this case, the information processing apparatus 100 calculates the sum of drive ranges of the respective drive-type projectors 300, thereby setting a drivable region covering a wider range. In a region in which the drive ranges overlap, projection is taken over from a certain drive-type projector to a different drive-type projector.

<5-3. Application Examples of Usage Environment>

The projection environment is not limited to the above-mentioned indoor environment and may be, for example, a vehicle cabin environment. The feedback processing in the embodiment can also be applied to the use case in which a content is viewed at a desired place while a drive-type projector 300a is installed on a ceiling portion of a vehicle cabin as illustrated on the left side of FIG. 32 or a drive-type projector 300b is installed in a center portion of the vehicle cabin while facing upward as illustrated on the right side of FIG. 32. Drivable regions 70 and 71 in the vehicle cabin environment illustrated in FIG. 32 are supposed to be based on drivable regions of the drive-type projectors 300a and 300b, respectively. The drivable region is not limited thereto and may be a region excluding seats and places at which persons are located, a region excluding windows, or a (dynamically variable) region excluding a region onto which projection cannot be performed due to external light.

Figure 33:
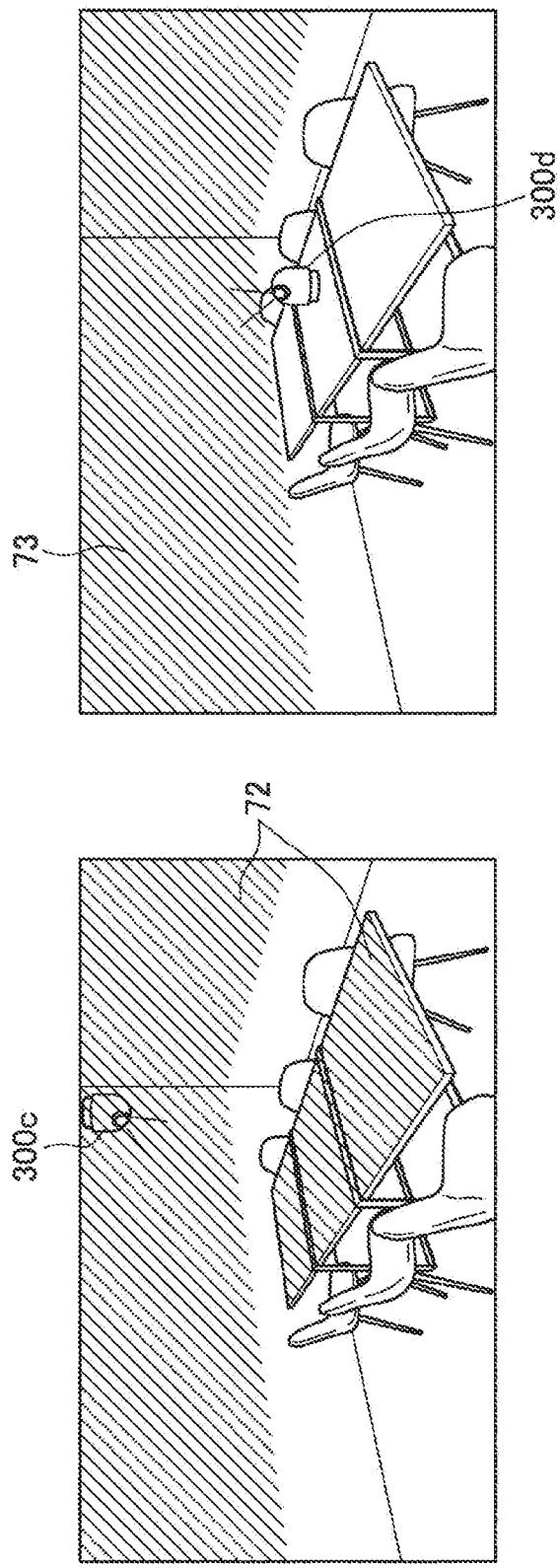
FIG. 33 is a view for explaining an application example to a conference room environment in the embodiment.

As another use environment, for example, as illustrated in FIG. 33, application to a conference room environment is supposed. The feedback processing in the embodiment can also be applied to the use case in which a content is viewed at a desired place while a drive-type projector 300c is installed on a ceiling portion of a conference room as illustrated on the left side of FIG. 33 or a drive-type projector 300d is installed on a desk in the conference room as illustrated on the right side of FIG. 33. Drivable regions 72 and 73 in the conference room environment illustrated in FIG. 33 are supposed to be determined in consideration of drivable regions of the drive-type projectors 300a and 300d and seat places (driving is applied the seat places). The drivable region is not limited thereto and may be a region excluding places at which persons are located, a region excluding windows (when no film for projection is attached thereto), or a (dynamically variable) region excluding a region onto which projection cannot be performed due to external light.

6. HARDWARE CONFIGURATION

Next, the hardware configuration of the information processing apparatus 100 in the embodiment of the present disclosure will be described with reference to FIG. 34. FIG. 34 is a block diagram illustrating an example of the hardware configuration of the information processing apparatus 100 in the embodiment of the present disclosure.

As illustrated in FIG. 34, the information processing apparatus 100 includes a central processing unit (CPU) 901, a read-only memory (ROM) 903, and a random-access memory (RAM) 905. The information processing apparatus 100 may include a host bus 907, a bridge 909, an external bus 911, an interface 913, a storage device 919, a drive 921, a connection port 923, and a communication device 925. The information processing apparatus 100 may include a processing circuit called a digital signal processor (DSP) or an application specific integrated circuit (ASIC) instead of the CPU 901 or in combination with it.

The CPU 901 functions as an arithmetic processing device and a control device and controls overall or some of the operations in the information processing apparatus 100 in accordance with various computer programs recorded in the ROM 903, the RAM 905, the storage device 919, or a removable recording medium 927. The ROM 903 stores therein computer programs and arithmetic parameters that the CPU 901 uses. The RAM 905 temporarily stores therein computer programs that are used in execution of the CPU 901 and parameters that change appropriately in the execution. The CPU 901, the ROM 903, and the RAM 905 are connected to one another via the host bus 907 configured by an internal bus such as a CPU bus. The host bus 907 is connected to the external bus 911 such as a peripheral component interconnect/interface (PCI) bus via the bridge 909.

The storage device 919 is a device for data storage that is configured as an example of a storage unit of the information processing apparatus 100. The storage device 919 is configured by, for example, a magnetic storage device such as a hard disk drive (HDD), a semiconductor storage device, an optical storage device, or a magneto-optical storage device. The storage device 919 stores therein computer programs and various pieces of data that the CPU 901 executes and various pieces of externally acquired data.

The drive 921 is a reader/writer for a removable recording medium 927 such as a magnetic disk, an optical disc, a magneto-optical disk, and a semiconductor memory, and is incorporated in or externally attached to the information processing apparatus 100. The drive 921 reads information recorded in the attached removable recording medium 927 and outputs it to the RAM 905. The drive 921 writes records into the attached removable recording medium 927.

The connection port 923 is a port for directly connecting an apparatus to the information processing apparatus 100. The connection port 923 can be, for example, a universal serial bus (USB) port, an IEEE1394 port, or a small computer system interface (SCSI) port. The connection port 923 may be an RS-232C port, an optical audio terminal, or a high-definition multimedia interface (HDMI (registered trademark)) port. Various pieces of data can be exchanged between the information processing apparatus 100 and an external connection apparatus 929 by connecting the external connection apparatus 929 to the connection port 923.

The communication device 925 is, for example, a communication interface configured by a communication device or the like for connecting the information processing apparatus 100 to a network 931. The communication device 925 can be, for example, a communication card for a wired or wireless local area network (LAN), Bluetooth (registered trademark), or a wireless USB (WUSB). The communication device 925 may be a router for optical communication, a router for an asymmetric digital subscriber line (ADSL), or any of various communication modems. The communication device 925, for example, transmits and receives signals and the like to and from the Internet or another communication device using a specific protocol such as TCP/IP. The network 931 that is connected to the communication device 925 is a network connected in a wired or wireless manner and may be, for example, the Internet, a home LAN, infrared communication, radio wave communication, or satellite communication.

An example of the hardware configuration of the information processing apparatus 100 has been described above. The above-mentioned components may be configured by general members or hardware specific to the functions of the components. The configuration can be appropriately changed in accordance with a technology level in implementation.

7. CONCLUSION

As described above, the information processing system in the embodiment of the present disclosure enables the user to recognize the boundary of the drivable range by feedback for the projection specification position to facilitate determination of and search for the projection position.

The preferred embodiment of the present disclosure has been described in detail with reference to the accompanying drawings. The present technology is, however, not limited to the embodiment. It is obvious that those skilled in the technical field of the present disclosure can arrive at various variations or modifications within a range of the technical spirit described in the scope of the claims and it is understood that they also belong to the technical range of the present disclosure.

For example, a computer program for exerting the functions of the information processing apparatus 100, the input device 200, or the drive-type projector 300 described above can also be created in the hardware such as the CPU, the ROM, and the RAM incorporated in the information processing apparatus 100, the input device 200, or the drive-type projector 300. A computer-readable storage medium storing therein the above-mentioned computer program can also be provided.

The effects described in the present specification are descriptive or illustrative and are non-limiting. That is to say, the technique according to the present disclosure can provide other effects that are obvious to those skilled in the art based on the description of the present specification, in addition to or instead of the above-mentioned effects.

The technique can also employ the following configurations.

(1)

An information processing apparatus comprising a controller configured to perform processing of outputting feedback indicating an effect corresponding to a boundary of a drivable region of a drive-type projector in a projection environment space in accordance with a state of a projection specification position specified by a user for the drivable region, the state being determined based on the drivable region and the projection specification position.

(2)

The information processing apparatus according to (1), wherein the state that is determined includes a distance between the projection specification position and the boundary, and the controller controls intensity of the effect in accordance with the distance between the projection specification position and the boundary.

(3)

The information processing apparatus according to (2), wherein the controller performs the feedback by reflecting the effect in accordance with the determined state to a projection image, sound output, drive control of the drive-type projector, or vibration control of an input device of the projection specification position.

(4)

The information processing apparatus according to (3), wherein the controller intensifies the effect as the distance between the projection specification position and the boundary in the vicinity of the projection specification position is shorter in a state where the projection specification position is located inside the drivable region.

(5)

The information processing apparatus according to (4), wherein the controller changes a shape or a color tone of a pointer image or a content image projected onto the projection specification position, as the effect.

(6)

The information processing apparatus according to (5), wherein the controller decreases a size of the pointer image or the content image projected at the projection specification position or causes the pointer image or the content image to wane as the projection specification position becomes closer to the boundary, as the effect.

(7)

The information processing apparatus according to (5), wherein the controller does not display a portion of a region of the pointer image or the content image that is located outside the boundary, as the effect.

(8)

The information processing apparatus according to any one of (5) to (7), wherein when the pointer image or the content image is close to the boundary and reaches the boundary, the controller performs display in which the pointer image or the content image hits the boundary and swings, display in which a color tone of the pointer image or the content image is changed, display in which the pointer image or the content image flashes, or display in which the pointer image or the content image rebounds, as the effect.

(9)

The information processing apparatus according to (5) or (6), wherein the controller changes a color tone of a portion of a region of the pointer image or the content image that is located outside the boundary, as the effect.

(10)

The information processing apparatus according to (5) or (6), wherein the controller changes a drawing position in a projection image such that the pointer image or the content image does not protrude outside the boundary, as the effect.

(11)

The information processing apparatus according to (4), wherein the controller displays an undrivable region as a region outside the boundary, as the effect.

(12)

The information processing apparatus according to (11), wherein the controller intensifies a color tone of the undrivable region as the projection specification position becomes closer to the boundary.

(13)

The information processing apparatus according to (1), wherein the controller displays a bird's-eye view image of the projection environment space that indicates a trajectory of the projection specification position and the drivable region in a state where the projection specification position is moved to inside of the drivable region from outside.

(14)

The information processing apparatus according to (2), wherein the controller displays an effect image that changes in accordance with a shortest distance between the boundary and the projection specification position at a position on the boundary in a state where the projection specification position is moved to inside of the drivable region from outside.

(15)

The information processing apparatus according to (2), wherein the controller displays an effect image that extends in a direction of the projection specification position from a position on the boundary and changes in accordance with a distance to the projection specification position in a state where the projection specification position is moved to inside of the drivable region from outside.

(16)

The information processing apparatus according to (1), wherein the controller displays a bird's-eye view image of the projection environment space that indicates a trajectory of the projection specification position and the drivable region in a state where the projection specification position is located outside the drivable region for constant time.

(17)

The information processing apparatus according to any one of (1) to (16), wherein the controller dynamically changes the drivable region in accordance with environment change of the projection environment space.

(18)

The information processing apparatus according to any one of (1) to (17), wherein the controller determines, to the boundary, a boundary of a region on which the drivable region and a recognizable region of a sensor detecting the projection specification position overlap each other.

(19)

An information processing method comprising outputting, by a processor, feedback indicating an effect corresponding to a boundary of a drivable region of a drive-type projector in a projection environment space in accordance with a state of a projection specification position specified by a user for the drivable region, the state being determined based on the drivable region and the projection specification position.

(20)

A recording medium recording a computer program for causing a computer to function as a controller that performs processing of outputting feedback indicating an effect corresponding to a boundary of a drivable region of a drive-type projector in a projection environment space in accordance with a state of a projection specification position specified by a user for the drivable region, the state being determined based on the drivable region and the projection specification position.

REFERENCE SIGNS LIST

1 INFORMATION PROCESSING SYSTEM
100 INFORMATION PROCESSING APPARATUS
110 I/F UNIT
120 THREE-DIMENSIONAL SPACE RECOGNITION UNIT
130 PROJECTION SPECIFICATION POSITION DETECTOR
140 DRIVE BOUNDARY DETERMINATION UNIT
150 STATUS DETERMINATION UNIT
160 DRIVE CONTROLLER
170 IMAGE GENERATOR
180 SOUND GENERATOR
200 INPUT DEVICE
210 IR LED
220 COMMUNICATION MODULE
300 DRIVE-TYPE PROJECTOR
310 OUTPUT UNIT
311 PROJECTOR
312 ULTRASONIC SPEAKER
313 SPEAKER
320 SENSOR
321 CAMERA
322 BIRD'S-EYE VIEW CAMERA
323 DEPTH SENSOR
324 DISTANCE MEASURING SENSOR
325 THERMO SENSOR
330 DRIVE MECHANISM

The invention claimed is:

1. An information processing apparatus, comprising:
a controller configured to:
control output of a feedback indicating an effect corresponding to a boundary of a drivable region of a drive-type projector in a projection environment space, wherein
the feedback is in accordance with a state of a projection specification position specified by a user for the drivable region,
the state is determined based on the drivable region and the projection specification position, and
the state includes a distance between the projection specification position and the boundary; and
change an intensity of the effect in accordance with a change in the distance between the projection specification position and the boundary.

2. The information processing apparatus according to claim 1, wherein the controller is further configured to control the effect in accordance with the determined state, wherein the effect corresponds to one of a projection image, a sound output, drive control of the drive-type projector, or vibration control of an input device of the projection specification position.

3. The information processing apparatus according to claim 2, wherein
the controller is further configured to intensify the effect as the distance between the projection specification position and the boundary in a vicinity of the projection specification position becomes shorter in a state where the projection specification position is located inside the drivable region.

4. The information processing apparatus according to claim 3, wherein the controller is further configured to change one of a shape or a color tone of a pointer image or a content image projected onto the projection specification position, as the effect.

5. The information processing apparatus according to claim 4, wherein the controller is further configured to one of decrease a size of the pointer image or the content image or cause the pointer image or the content image to wane as the projection specification position becomes closer to the boundary, as the effect.

6. The information processing apparatus according to claim 4, wherein the controller is further configured to not display a portion of a region of one of the pointer image or the content image that is located outside the boundary, as the effect.

7. The information processing apparatus according to claim 4, wherein in a case where one of the pointer image or the content image is close to the boundary and reaches the boundary, the controller is further configured to perform one of display in which one of the pointer image or the content image hits the boundary and swings, display in which the color tone of one of the pointer image or the content image is changed, display in which one of the pointer image or the content image flashes, or display in which one of the pointer image or the content image rebounds, as the effect.

8. The information processing apparatus according to claim 4, wherein the controller is further configured to change the color tone of a portion of a region of one of the pointer image or the content image that is located outside the boundary, as the effect.

9. The information processing apparatus according to claim 4, wherein the controller is further configured to change a drawing position in the projection image such that one of the pointer image or the content image does not protrude outside the boundary, as the effect.

10. The information processing apparatus according to claim 3, wherein the controller is further configured to display an undrivable region as a region outside the boundary, as the effect.

11. The information processing apparatus according to claim 10, wherein the controller is further configured to intensify a color tone of the undrivable region as the projection specification position becomes closer to the boundary.

12. The information processing apparatus according to claim 1, wherein the controller is further configured to display a bird's-eye view image of the projection environment space that indicates a trajectory of the projection specification position and the drivable region in a state where the projection specification position is moved to inside of the drivable region from outside.

13. The information processing apparatus according to claim 1, wherein
the controller is further configured to control display of an effect image that changes in accordance with a decrease in the distance between the boundary and the projection specification position, and
the effect image is displayed at a position on the boundary in a state where the projection specification position is moved to inside of the drivable region from outside.

14. The information processing apparatus according to claim 1, wherein
the controller is further configured to control display of an effect image that extends in a direction of the projection specification position from a position on the boundary and that changes in accordance with the distance to the projection specification position in a state where the projection specification position is moved to inside of the drivable region from outside.

15. The information processing apparatus according to claim 1, wherein
the controller is further configured to display a bird's-eye view image of the projection environment space that indicates a trajectory of the projection specification position and the drivable region in a state where the projection specification position is located outside the drivable region for a constant time.

16. The information processing apparatus according to claim 1, wherein the controller is further configured to dynamically change the drivable region in accordance with environment change of the projection environment space.

17. The information processing apparatus according to claim 1, wherein the controller is further configured to determine, as the boundary, a boundary of a region on which the drivable region overlaps a recognizable region of a sensor detecting the projection specification position.

18. An information processing method, comprising
controlling, by a processor, output of a feedback indicating an effect corresponding to a boundary of a drivable region of a drive-type projector in a projection environment space, wherein
the feedback is in accordance with a state of a projection specification position specified by a user for the drivable region,
the state is determined based on the drivable region and the projection specification position, and
the state includes a distance between the projection specification position and the boundary; and
chancing, by the processor, an intensity of the effect in accordance with a change in the distance between the projection specification position and the boundary.

19. A non-transitory computer-readable medium having stored thereon computer-executable instructions which, when executed by a processor, cause the processor to execute operations, the operations comprising:
controlling output of a feedback indicating an effect corresponding to a boundary of a drivable region of a drive-type projector in a projection environment space, wherein
the feedback is in accordance with a state of a projection specification position specified by a user for the drivable region,
the state is determined based on the drivable region and the projection specification position, and
the state includes a distance between the projection specification position and the boundary; and
changing an intensity of the effect in accordance with a change in the distance between the projection specification position and the boundary.

20. An information processing apparatus, comprising:
a controller configured to:
control output of a feedback indicating an effect corresponding to a boundary of a drivable region of a drive-type projector in a projection environment space, wherein
the feedback is in accordance with a state of a projection specification position specified by a user for the drivable region, and
the state is determined based on the drivable region and the projection specification position; and
control display of a bird's-eye view image of the projection environment space that indicates a trajectory of the projection specification position and the drivable region in a state where the projection specification position is moved to inside of the drivable region from outside.

* * * * *